US010545487B2

(12) United States Patent
Horn et al.

(10) Patent No.: US 10,545,487 B2
(45) Date of Patent: Jan. 28, 2020

(54) INTERACTIVE DIAGNOSTIC SYSTEM AND METHOD FOR MANAGING PROCESS MODEL ANALYSIS

(71) Applicant: UOP LLC, Des Plaines, IL (US)

(72) Inventors: Ian G. Horn, Streamwood, IL (US); Zak Alzein, Burr Ridge, IL (US); Paul Kowalczyk, Hoffman Estates, IL (US); Christophe Romatier, Wilmette, IL (US); David Rondeau, Stoneham, MA (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/706,204

(22) Filed: Sep. 15, 2017

(65) Prior Publication Data

US 2018/0082569 A1 Mar. 22, 2018

Related U.S. Application Data

(60) Provisional application No. 62/395,912, filed on Sep. 16, 2016.

(51) Int. Cl.
*G05B 19/418* (2006.01)
*G06F 3/0481* (2013.01)
(Continued)

(52) U.S. Cl.
CPC ......... *G05B 19/4184* (2013.01); *G05B 23/02* (2013.01); *G05B 23/0218* (2013.01);
(Continued)

(58) Field of Classification Search
CPC .............. G08B 21/187; G05B 23/0267; G05B 19/4184; G06F 19/3406; G06F 17/3061;
(Continued)

(56) References Cited

U.S. PATENT DOCUMENTS 4,267,458 A * 5/1981 Uram ...................... F01D 17/24
290/40 R
4,902,469 A * 2/1990 Watson .................. G21C 17/00
376/216

(Continued)

OTHER PUBLICATIONS

International Search Report for PCT application No. PCT/US2017/051954, dated Dec. 14, 2017.

(Continued)

*Primary Examiner* — Hoi C Lau

(57) ABSTRACT

A diagnostic system is provided for diagnosing a process of a plant, using a computing device. A detection unit automatically detects a faulty condition of the process based on a plurality of readings of parameters or measurements associated with the faulty condition for alerting an operator. An analysis unit determines an operating status of the plant based on the plurality of readings of parameters or measurements. A display device graphically links the faulty condition with the plurality of readings of parameters or measurements. A visualization unit displays the operating status of the plant with the readings of parameters or measurements using an alert dashboard grouping related data based on a source of the data for meaningfully illustrating relationships of the displayed data. An alert unit automatically generates a warning message based on the plurality of readings of parameters or measurements to inform the operator of the faulty condition.

6 Claims, 21 Drawing Sheets

(51) Int. Cl.
*G08B 21/18* (2006.01)
*G05B 23/02* (2006.01)
*G06F 3/147* (2006.01)

(52) U.S. Cl.
CPC ......... *G06F 3/0481* (2013.01); *G08B 21/187* (2013.01); *G05B 2219/31124* (2013.01); *G05B 2219/31439* (2013.01); *G05B 2219/32128* (2013.01); *G06F 3/147* (2013.01); *G06F 2203/04803* (2013.01); *Y02P 90/02* (2015.11); *Y02P 90/20* (2015.11); *Y02P 90/30* (2015.11)

(58) Field of Classification Search
CPC ...... G06F 3/1234; G06Q 10/06; G06Q 50/04; G21C 17/00
See application file for complete search history.

(56) References Cited

U.S. PATENT DOCUMENTS

| | | | | |
|---|---|---|---|---|
| 5,227,121 A | * | 7/1993 | Scarola | G21C 17/00 340/525 |
| 5,642,296 A | * | 6/1997 | Saxena | H01L 22/20 216/84 |
| 6,081,230 A | * | 6/2000 | Hoshino | G01C 21/165 342/357.32 |
| 6,230,486 B1 | * | 5/2001 | Yasui | F02D 41/1402 123/674 |
| 6,266,605 B1 | * | 7/2001 | Yasui | F02D 41/1403 60/276 |
| 6,271,845 B1 | * | 8/2001 | Richardson | H04L 41/0893 715/764 |
| 6,795,798 B2 | | 9/2004 | Eryurek et al. | |
| 8,630,962 B2 | * | 1/2014 | Maeda | G05B 23/0254 706/12 |
| 9,053,260 B2 | | 6/2015 | Romatier et al. | |
| 9,864,823 B2 | * | 1/2018 | Horn | G01F 15/022 |
| 10,222,787 B2 | * | 3/2019 | Romatier | G05B 19/4184 |
| 2008/0086322 A1 | * | 4/2008 | Wallace | G06Q 10/06 705/342 |
| 2013/0311437 A1 | * | 11/2013 | Stluka | G06F 16/285 707/706 |
| 2016/0048119 A1 | * | 2/2016 | Wojsznis | G05B 19/0423 700/11 |
| 2016/0098234 A1 | * | 4/2016 | Weaver | G06F 3/1234 358/1.15 |
| 2016/0260041 A1 | * | 9/2016 | Horn | G06Q 10/06316 |
| 2016/0291584 A1 | | 10/2016 | Horn et al. | |
| 2016/0292188 A1 | * | 10/2016 | Horn | G05B 23/0216 |
| 2016/0292325 A1 | * | 10/2016 | Horn | G01F 15/022 |
| 2016/0313653 A1 | * | 10/2016 | Mink | G03F 7/705 |
| 2018/0081344 A1 | * | 3/2018 | Romatier | G05B 19/4184 |
| 2018/0082569 A1 | * | 3/2018 | Horn | G08B 21/187 |
| 2018/0122021 A1 | * | 5/2018 | Horn | G06Q 50/04 |

OTHER PUBLICATIONS

Written Opinion of the International Searching Authority for PCT application on. PCT/US2017/051954, dated Dec. 5, 2017.

* cited by examiner

INTERACTIVE DIAGNOSTIC SYSTEM AND METHOD FOR MANAGING PROCESS MODEL ANALYSIS

FIELD OF THE INVENTION

The present invention is related to methods and systems for controlling the operation of a plant, such as a petrochemical plant or a refinery, and more particularly to interactive diagnostic systems for managing process model analysis.

BACKGROUND OF THE INVENTION

A diagnostic system for monitoring a refinery unit is an important feature of controlling the operation of the plant for early detection of a faulty condition based on a change in a process model. Companies operating refineries and petrochemical complexes typically face tough challenges in today's environment. These challenges may include a slow detection of and response to the faulty condition, increasingly complex technologies, a reduction in workforce experience levels and changing environmental regulations.

Facilitating a troubleshooting or corrective action for correcting the faulty condition is a difficult task for a plant operator. A timely and prompt corrective action is needed to save operational expenses and time for an enhanced outcome of the plant. In certain cases, reviewing data related to the faulty condition on a periodic basis is a time-consuming, complicated and difficult process for the plant operator.

However, conventional diagnostic systems lack effective alert mechanisms that provide accurate notifications for the plant operator. Further, when the plant operator is in need of additional assistance from a process specialist, the conventional diagnostic systems are unable to provide adequate alerts to the process specialist.

Developing an intuitive interface is an important task for the plant operator because a proper diagnostic analysis of a chemical process can promptly identify a root cause of the faulty condition. Promptly identifying the root cause of the faulty conditions or operational gaps can significantly reduce the operational expenses and time.

Therefore, there is a need for an improved diagnostic system for plant operators to respond to these challenges by providing an effective interactive diagnostic system for managing the process model analysis.

SUMMARY OF THE INVENTION

A general object of the invention is to improve diagnostic operation efficiency of petrochemical plants and refineries. A more specific object of this invention is to overcome one or more of the problems described above. A general object of this invention can be attained, at least in part, through methods and systems for diagnosing a process of a plant.

The present invention comprehends a diagnostic system for diagnosing a process of a plant. A detection unit is configured for automatically detecting a faulty condition of the process based on a plurality of readings of parameters or measurements associated with the faulty condition for alerting an operator. An analysis unit is configured for determining an operating status of the plant based on the plurality of readings of parameters or measurements. A display device is configured for graphically linking the faulty condition with the plurality of readings of parameters or measurements. A visualization unit is configured for displaying the operating status of the plant with the readings of parameters or measurements using an alert dashboard grouping related data based on a source of the data for meaningfully illustrating relationships of the displayed data. An alert unit is configured for automatically generating a warning message based on the plurality of readings of parameters or measurements to inform the operator of the faulty condition.

In example diagnostic systems, the detection unit identifies a causal relationship that leads to finding a root cause of the faulty condition. In example diagnostic systems, the plurality of readings of parameters or measurements are related to at least one of a process model, a kinetic model, a parametric model, an analytical tool, and a related knowledge and best standard. In example diagnostic systems, the analysis unit generates a process decision tree based on at least one of an expert knowledge and a causal relationship between the faulty condition and corresponding parameters or measurements.

An example diagnostic system provides a web-based computer system. The benefits of executing work processes within this platform include improved plant economic performance due to an increased ability by operations to identify and capture economic opportunities, a sustained ability to bridge performance gaps, an increased ability to leverage personnel expertise, and improved enterprise management. The present invention is a new and innovative way of using advanced computing technology in combination with other parameters to change the way plants, such as refineries and petrochemical facilities, are operated.

The present invention uses a data collection system at a plant to capture data which is automatically sent to a remote location, where it is reviewed to, for example, eliminate errors and biases, and used to calculate and report performance results. The performance of the plant and/or individual process units of the plant is/are compared to the performance predicted by one or more process models to identify any operating differences, or gaps.

A diagnostic report, such as a daily report, showing actual performance compared to predicted performance can be generated and delivered to a plant operator and/or a plant or third party process engineer or specialist, via, for example, the internet or other wireless communication means. The identified performance gaps or differences allow the operators and/or engineers to identify and resolve the cause of the gaps. The method of this invention further uses the process models and plant operation information to run optimization routines that converge on an optimal plant operation for the given values of, for example, feed, products and prices.

The present invention further contemplates an alert dashboard for displaying a plurality of readings or parameters associated with a faulty condition of a process of a plant. The alert dashboard comprises at least one window section including at least one primary component sub-window section in a predetermined standardized window configuration, and at least one warning button disposed in at least one of the at least one window sections configured for performing a hierarchical navigation relating to each faulty condition displayed in the corresponding window section. A specific location of the corresponding window section in the alert dashboard signifies a priority level of importance relative to one another.

Example methods and systems can provide plant operators and/or engineers with regular advice that enable recommendations to adjust process conditions allowing the plant to run continuously at or closer to optimal conditions. The operator can be provided with alternatives for improving or modifying the operations of the plant. Example methods and systems can regularly maintain and tune process models to correctly represent a true potential performance of the plant based on one or more signals and parameters related to the operations of the plant. Example methods can include economic optimization routines configured per the operator's specific economic criteria which are used to identify optimum operating points, evaluate alternative operations and perform feed evaluations.

Example methods and systems can provide a repeatable method that will help refiners bridge the gap between actual and achievable economic performance. Example methods and systems can utilize process development history, modeling and stream characterization, and plant automation experience to enhance data security as well as provide more efficient aggregation, management and movement of large amounts of data. Web-based optimization can be employed to achieve and sustain maximum process performance by connecting, on a virtual basis, technical expertise and the plant process operations staff.

The enhanced workflow in example methods and systems utilizes configured process models to monitor, diagnose, predict, and optimize performance of individual process units, operating blocks, or complete processing systems. Routine and frequent analysis of predicted versus actual performance allows early identification of operational discrepancies which can be acted upon to optimize financial impact.

As used herein, references to a "routine" are to be understood to refer to a sequence of computer programs or instructions for performing a particular task. References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, and others interested in, overseeing, and/or running the daily operations at a plant.

The foregoing and other aspects and features of the present invention will become apparent to those of reasonable skill in the art from the following detailed description, as considered in conjunction with the accompanying drawings.

DETAILED DESCRIPTION

Figure 1:
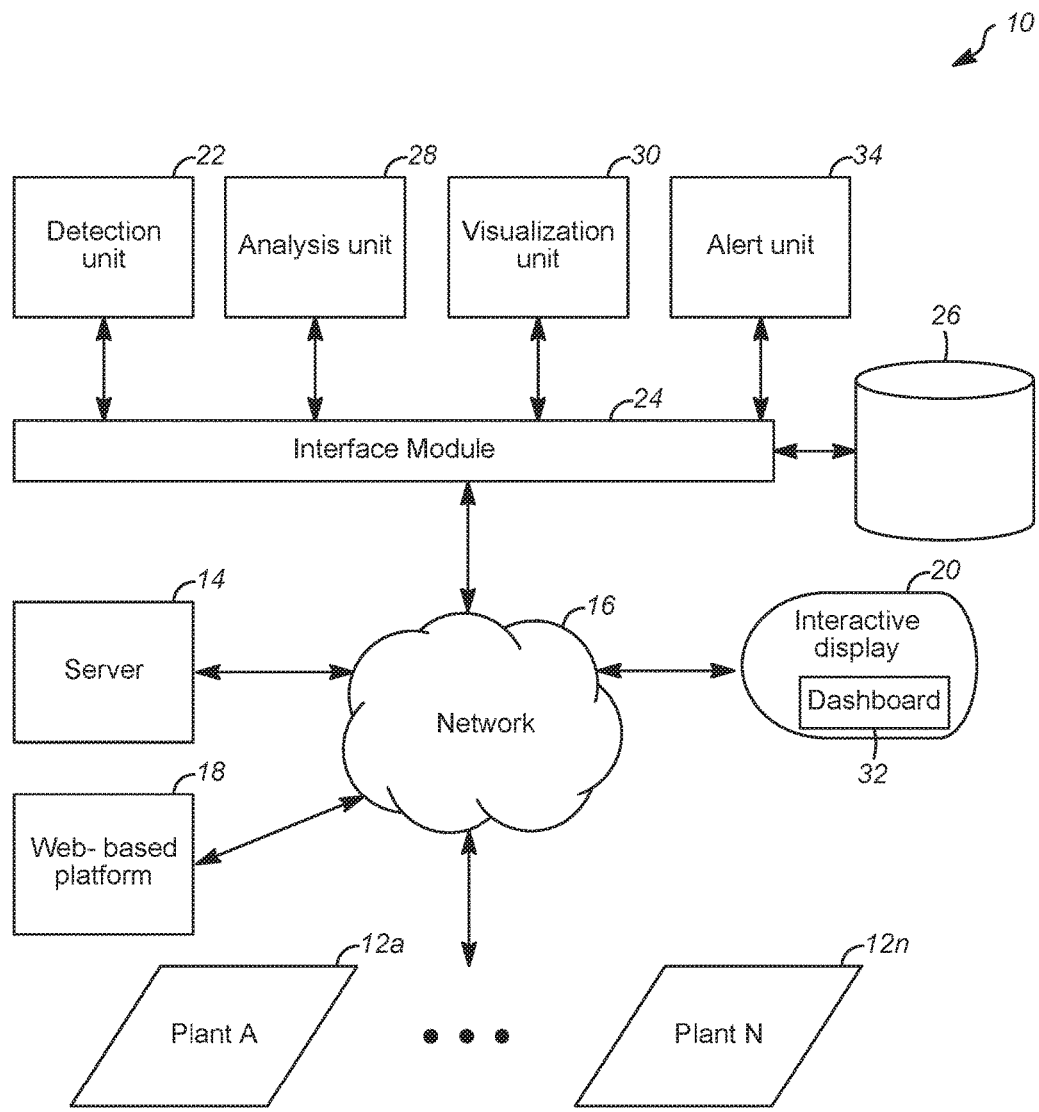
FIG. 1 illustrates the present diagnostic system in accordance with an embodiment of the present disclosure.

Referring now to FIG. 1, an exemplary diagnostic system, generally designated 10, according to an embodiment of the present disclosure is provided for improving operation of one or more plants (e.g., Plant A . . . Plant N) 12a-12n, such as a chemical plant or refinery, or a portion thereof. The present diagnostic system 10 uses plant operation information obtained from at least one plant 12a-12n, which can be the current plant (e.g., Plant A) 12a, other third party or customer plants (e.g., Plant N) 12n, and/or proprietary services, subsidiaries, and the like, as known in the art. The plant operation information can be obtained, for example, from a plant management system (e.g., software executed on one or more computers) provided for one or more of the plants 12a-12n. Exemplary plant management systems are disclosed in U.S. Patent Application Ser. Nos. 62/127,642 filed Mar. 3, 2015, 62/140,043 filed Mar. 30, 2015, 62/140,039 filed Mar. 30, 2015, 62/140,029 filed Mar. 30, 2015, Ser. No. 15/058,658 filed Mar. 2, 2016, Ser. No. 15/084,291 filed Mar. 29, 2016, Ser. No. 15/084,319 filed Mar. 29, 2016, and, Ser. No. 15/084,237 filed Mar. 29, 2016, all of which are incorporated by reference in their entireties.

As used herein, the term "system," "unit" or "module" may refer to, be part of, or include an Application Specific Integrated Circuit (ASIC), an electronic circuit, a computer processor (shared, dedicated, or group) and/or memory (shared, dedicated, or group) that executes one or more software or firmware programs, a combinational logic circuit, and/or other suitable components that provide the described functionality.

Thus, while this disclosure includes particular examples and arrangements of the units, the scope of the present system should not be so limited since other modifications will become apparent to the skilled practitioner. It is contemplated that the software programs may be written in HTML5, CSS3, Java script, and the like. Other suitable computer programming languages are also contemplated.

The diagnostic system 10 may reside in or be coupled to a server or computing device 14 (including, e.g., database and video servers), and is programmed to perform tasks and display relevant data for different functional units via a communication network 16, preferably using a secured cloud computing infrastructure. It is contemplated that other suitable networks can be used, such as the internet, a wireless network (e.g., Wi-Fi), a corporate Intranet, a local area network (LAN) or a wide area network (WAN), and the like, using any suitable communication methods known in the art. All relevant information can be stored in databases for retrieval by the diagnostic system 10 or the computing device 14 (e.g., as a data storage device and/or a machine readable data storage medium carrying computer programs).

Further, the present diagnostic system 10 can be partially or fully automated. In one preferred embodiment of this invention, the diagnostic system 10 is performed by a computer system, such as a third-party computer system, remote from the plant 12a-12n and/or a plant planning center. The present diagnostic system 10 preferably includes a web-based platform 18 that obtains or receives and sends information over, for example, the internet. Specifically, the diagnostic system 10 receives signals and parameters via the communication network 16, and displays in real time related performance information on an interactive display device 20 accessible to an operator or user.

Using a web-based system for implementing example methods provides many benefits, such as improved plant economic performance due to an increased ability by plant operators to identify and capture economic opportunities, a sustained ability to bridge plant performance gaps, and an increased ability to leverage personnel expertise and improve training and development. Example methods allow for automated daily evaluation of process performance, thereby increasing the frequency of performance review with less time and effort required from plant operations staff.

The web-based platform 18 allows all users to work with the standardized information, thereby creating a collaborative environment for sharing best practices or for troubleshooting. The method of this invention provides more accurate prediction and optimization results due to fully configured models which can include, for example, catalytic yield representations, constraints, degrees of freedom, and the like. Routine automated evaluation of plant planning and operation models allows timely plant model tuning to reduce or eliminate gaps between plant models and the actual plant performance. Implementing example methods using the web-based platform 18 also allows for monitoring and updating multiple sites, thereby better enabling facility planners to propose realistic optimal targets.

As further shown in FIG. 1, the example diagnostic system 10 includes a detection unit 22 configured for detecting a faulty condition of the refining or petrochemical process of at least one plant 12a-12n. It is difficult for operators in the refining and petrochemical field to detect and report all faulty conditions at each level of an entire complex of the plant 12a-12n because there are various parameters or measurements that may not provide a cohesive basis for diagnosing all process models being executed. It is advantageous that the detection unit 22 automatically detects the faulty condition based on readings of the parameters or measurements associated with sensors for alerting the operators.

The example diagnostic system can utilize process measurements from any one or more of the following devices: pressure sensors, differential pressure sensors, orifice plates, venturi, other flow sensors, temperature sensors, capacitance sensors, weight sensors, gas chromatographs, moisture sensors, and other sensors commonly found in the refining and petrochemical industry, as is known in the art. Further, process laboratory measurements may be utilized from one or more of gas chromatographs, liquid chromatographs, distillation measurements, octane measurements, and other laboratory measurements commonly found in the refining and petrochemical industry.

The process measurements are used to monitor the performance of any one or more of the following process equipment: pumps, compressors, heat exchangers, fired heaters, control valves, fractionation columns, reactors and other process equipment commonly found in the refining and petrochemical industry.

It is contemplated that the detection unit 22 identifies a causal relationship that leads to finding a root cause of chemical process disruptions and poor process operations. For example, the detection unit 22 identifies a plurality of operational issues or faulty conditions and prepares for a systematic drill down navigation to a set of potential root causes of the process disruptions and poor process operations. Subsequently, the plant operator can investigate the root causes for correcting the faulty condition.

Also included in the diagnostic system 10 is an interface module 24 for providing an interface between the diagnostic system 10, one or more internal or external databases 26, and the network 16. The interface module 24 receives data from, for example, plant sensors and parameters via the network 16, and other related system devices, services, and applications. The other devices, services, and applications may include, but are not limited to, one or more software or hardware components, etc., related to the respective plants 12a-12n. The interface module 24 also receives the signals and/or parameters, which are communicated to the respective units and modules, such as the diagnostic system 10, and its associated computing modules or units.

It is contemplated that the present diagnostic system 10 further includes an analysis unit 28 configured for determining an operating status of the refinery or petrochemical plant to ensure robust and profitable operation of the plant 12a-12n. The analysis unit 28 determines the operating status based on the readings of parameters or measurements relating to at least one of a process model, a kinetic model, a parametric model, an analytical tool, and a related knowledge and best practice standard.

Figure 2:
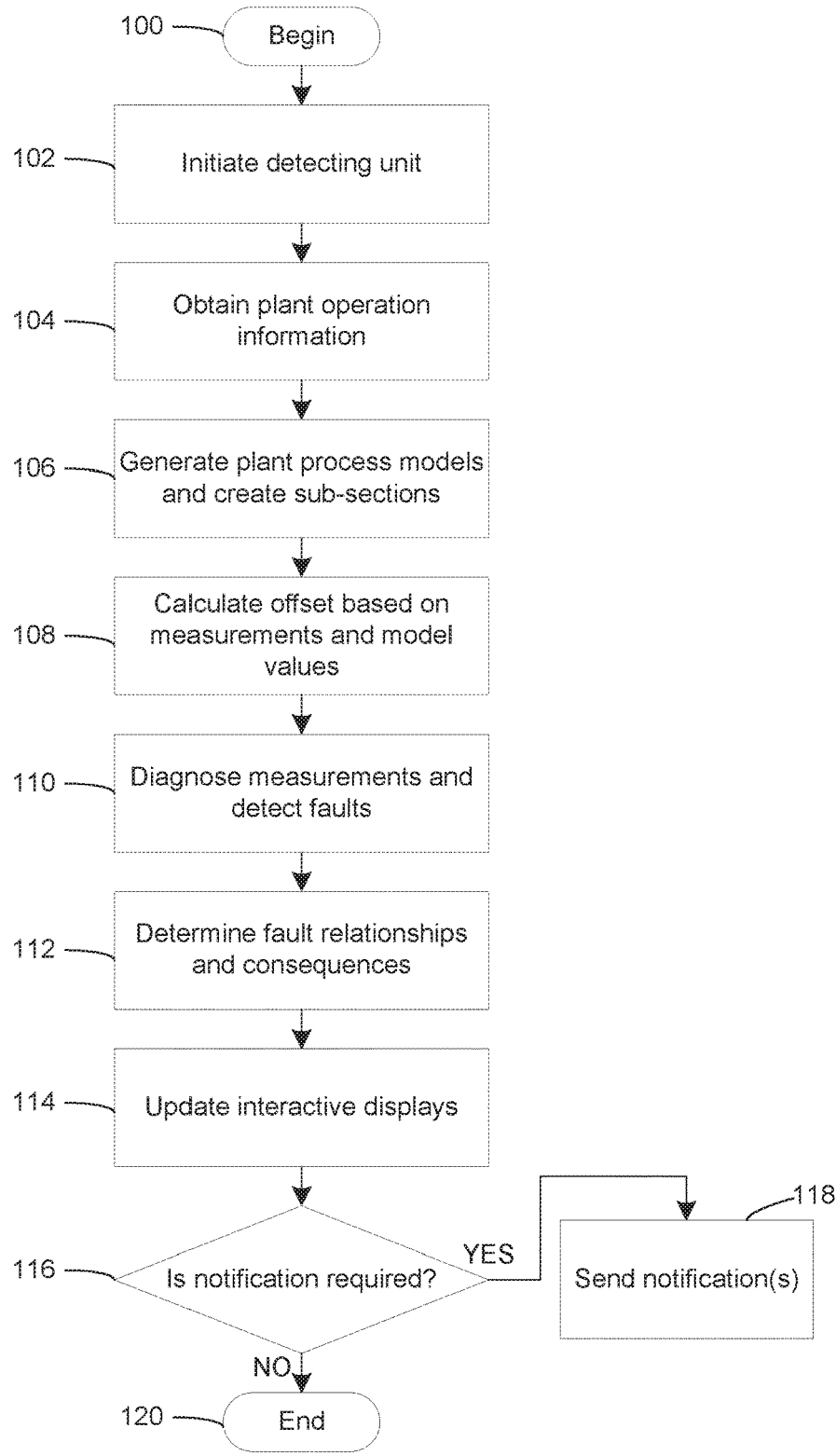
FIG. 2 is a flowchart illustrating an operation of the example diagnostic system.

FIG. 2 shows an example operation of the diagnostic system 10. The diagnostic system 10 provides an automatic detection and diagnosis of faulty conditions based on one or more environmental factors from readings of parameters or measurements associated with the faulty conditions. These environmental factors include at least one primary factor, and an optional secondary factor. The primary factor includes, for example, a temperature, a pressure, a feed flow, a product flow, and the like. The secondary factor includes, for example, a density, a specific composition, and the like. An offset amount representing a difference between the feed and product information is calculated and evaluated for detecting an error of specific equipment during plant operation.

In an example operation, the diagnostic system 10 receives at least one set of actual measured data from the plant 12a-12n on a recurring basis at a specified time interval, such as for example, every 100 milliseconds, every second, every ten seconds, every minute, every two minutes, etc. The received data is analyzed for completeness and corrected for gross errors. Then, the data is corrected for measurement issues (e.g., an accuracy problem for establishing a simulation steady state) and overall mass balance closure to generate a duplicate set of reconciled plant data.

By performing data reconciliation over an entire subsection of the flow, substantially all of the process data relating to particular equipment can be used to reconcile the associated operational plant parameters. At least one plant operational parameter, such as but not limited to a mass flow rate, is utilized in the correction of the mass balance. Offsets calculated for the plant measurements can be tracked and stored in the one or more external databases 26 for subsequent retrieval.

The example method begins at step 100. In step 102, the detection unit 22 is initiated by a computer system that is inside or remote from the plant 12a-12n. The method is desirably automatically performed by the computer system; however, the invention is not intended to be so limited. One or more steps can include manual operations or data inputs from the sensors and other related systems, as desired.

In step 104, the detection unit 22 obtains plant operation information or plant data from the plant 12a-12n over the network 16. The desirable plant operation information or plant data includes plant operational parameter readings, measurements (e.g., data measured by sensors in the plant), plant lab data and/or information about plant constraints. As used herein, "plant lab data" refers to the results of periodic laboratory analyses of fluids taken from an operating process plant.

In step 106, a plant process model is generated using the plant operation information. The plant process model estimates or predicts plant performance that is expected based upon the plant operation information, i.e., how the plant 12a-12n is operated. The plant process model results can be used to monitor the health of the plant 12a-12n and to determine whether any upset or poor measurement occurred. The plant process model is desirably generated by an iterative process that models at various plant constraints to determine the desired plant process model.

The generated plant process model can further be divided into sub-sections, though this is not required in all methods. In an example method for creating sub-sections, a simulation is utilized to model the operation of the plant 12a-12n. Because the simulation for the entire unit may be quite large and complex to solve in a reasonable amount of time, each plant 12a-12n may be divided into smaller virtual sub-sections consisting of related unit operations. An exemplary process simulation unit 10, such as a UNISIM® Design Suite, is disclosed in U.S. Patent Publication No. 2010/0262900, now U.S. Pat. No. 9,053,260, which is incorporated by reference in its entirety.

For example, in one embodiment, a fractionation column and its related equipment such as its condenser, receiver, reboiler, feed exchangers, and pumps would make up a sub-section. All available plant data from the unit, including temperatures, pressures, flows, and laboratory data are included in the simulation as Distributed Control System (DCS) variables. Multiple sets of the plant data are compared against the process model and model fitting parameter and measurement offsets are calculated that generate the smallest errors.

In step 108, offsets are calculated based on measurements and model values. Fit parameters or offsets that change by more than a predetermined threshold, and measurements that have more than a predetermined range of error, may trigger further action. For example, large changes in offsets or fit parameters may indicate the model tuning may be inadequate. Overall data quality for the set of data may then be flagged as questionable.

More specifically, a measured value and corresponding simulated value are evaluated for detecting an error based on a corresponding offset. In a preferred embodiment, an offset is detected when the measured information is not in sync with the simulated information. The system uses evidence from a number of measurements and a process model to determine the simulated information.

As an example only, consider the following measurements: a feed with the composition of 50% component A and 50% component B and a flow of 200 pounds per hour (90.7 kg/hr) and two product streams, the first with a composition 99% component A and a flow of 100 pounds per hour (45.3 kg/hr) and the second with a composition of 99% component B and 95 pounds per hour (43.1 kg/hr). Based on the first-principles model, the total feed must equal the total product and the total amount of A or B in the feed must equal the total amount of A or B in the product. The expected flow of the second product stream would be 100 pounds per hour (45.3 kg/hr) and the operator can therefore assess that the offset between the measurement and simulation is 5 pounds per hour (2.27 kg/hr).

In step 110, the operational status of the measurements is diagnosed, e.g., based on at least one environmental factor, and a fault (or faults) is detected by the detection unit 22. As discussed elsewhere herein, the example diagnostic system 10 can use different models to determine the status of the plant and the presence of operating conditions that may be considered faults. The models used for detecting the faults can be heuristic, analytical, statistical, etc. In an example method, the calculated offset between the feed and product information is evaluated based on at least one environmental factor for detecting the fault of a specific measurement.

Next, in step 112, the analysis unit 28 determines fault relationships and consequences. Relationships between the faults can be determined from, for instance, expert knowledge, statistical analysis, or machine learning. In a preferred embodiment, the analysis unit 28 generates a comprehensive process decision tree based on at least one of an expert knowledge and a causal relationship between the faulty condition and the corresponding sensor signals, parameters, or measurements.

For example, the analysis unit 28 can receive historical or current performance data from at least one of the plants 12a-12n to proactively predict future actions to be performed. To predict various limits of a particular process and stay within the acceptable range of limits, the analysis unit 28 determines target operational parameters of a final product based on actual current and/or historical operational parameters, e.g., from a steam flow, a heater, a temperature set point, a pressure signal, and the like.

In using the kinetic model or other detailed calculations, the analysis unit 28 establishes boundaries or thresholds of operating parameters based on existing limits and/or operating conditions. Exemplary existing limits may include mechanical pressures, temperature limits, hydraulic pressure limits, and operating lives of various components. Other suitable limits and conditions are contemplated to suit different applications.

In using the knowledge and best practice standard, such as specific know-hows, the analysis unit 28 establishes relationships between operational parameters related to the specific process. For example, the boundaries on a naphtha reforming reactor inlet temperature may be dependent on a regenerator capacity and hydrogen-to-hydrocarbon ratio, which is itself dependent on a recycle compressor capacity.

Next, in step 114, the visualization unit 30 causes displays, such as the display device 20, to be updated. The display device 20 is configured for graphically linking the faulty condition detected by the detection unit 22 with the plurality of readings of parameters or measurements. It is preferred that the present diagnostic system 10 includes a visualization unit 30 configured for displaying plant performance variables using the display device 20. It is contemplated that the visualization unit 30 displays a current state of the plant 12a-12n, that is, the operating status of the plant with the readings of parameters or measurements, using an alert dashboard 32 on the display device 20, grouping related data based on a source of the data for meaningfully illustrating relationships of the displayed data.

The visualization unit 30 updates the screens of the display device 20 with context information that is provided by diagnosing measurements and detecting faults (step 110) and by determining fault relationships and consequences (step 112). For example, once the causal relationship is generated based on the decision tree, a human machine interface (HMI) is used to graphically link the faulty condition with the signals, parameters, or measurements. In some example methods, high level process key performance indicators (KPI) can be shown on the display device 20. If the diagnostic system 10 determines that conditions exist that might cause a key performance indicator to eventually be put at risk, the updated display devices 20 will indicate this information, provide context for what variables or factors are presenting this risk, and provide advice as to how to address the risk. In this configuration, the user quickly identifies the information, and effectively gains insightful interpretation presented by the displayed data.

In a preferred embodiment, the diagnostic system 10 interfaces with the network 16, and performs the performance analysis of the given plant 12a-12n. The diagnostic system 10 manages interactions between the operators and the present system by way of the HMI, such as a keyboard, a touch sensitive pad or screen, a mouse, a trackball, a voice recognition system, and the like. Other suitable interactive interfaces are contemplated to suit different applications.

Preferably, the display device 20 (e.g., textual and graphical) is configured for receiving an input signal from the operators and/or the diagnostic system 10. In one embodiment, the operator uses an input device, such as the HMI, to graphically or textually interact with the present system 10, using the alert dashboard 32. The signals and/or parameters are generally received in the diagnostic system 10 and then transferred to the alert dashboard 32 of the display device 20 via a dedicated communication system.

The diagnostic system 10 determines at step 116 whether a notification is required. In example embodiments, the diagnostic system 10 can be configured to set up notifications to individual users. Alternatively or additionally, users can be allowed to subscribe to notifications.

If a measurement is determined to be within a fault status, a notification, e.g., an alert, is sent to the operator at step 118. It is contemplated that the present diagnostic system 10 includes an alert unit 34 configured for automatically generating alerts such as a warning message for the operators and/or other related systems coupled to the present system based on the received signals, parameters, or measurements. Exemplary warning messages include, but are not limited to, an email, a text or voice message, and the like, such that selected technical service personnel and customers are informed of one or more faulty conditions of the specific chemical refining or petrochemical process. After the notification is sent (step 118), or if no notification is required (step 116), the process ends at step 120. The process can be repeated as needed.

Referring now to FIGS. 3A-3F, an exemplary Benzene Toluene Xylene (BTX) aromatics production complex alert dashboard, is shown to interpolate color indications and other signals for the plant parameters. The dashboard may use hue and color techniques to depict such signals. It is contemplated that the visualization unit 30 (FIG. 1) creates an interactive and visually engaging display for the operator using the alert dashboard 32. The dashboard 32 preferably provides an "at-a-glance" graphical presentation for drawing adequate attention to the important parameters, and insight into their meanings based on the hue and color techniques.

It is also contemplated that other suitable visualization techniques having visual indicators may be used to readily discriminate the quality of displayed data on the alert dashboard 32. Specifically, the visualization unit 30 provides a hierarchical structure of detailed explanation on the individual parameters shown on the alert dashboard 32, such that the user can selectively expand or drill down into a particular level of the individual parameters.

As described in greater detail below, to achieve a drill down navigation, selectively clicking on a warning button 36 in the initial screen using a cursor of a positional device (e.g., a mouse) can start and open up a new display window or pane with more detailed information about the warning.

It is also contemplated that other graphical icons, such as a number 37A or a confidence button 37B, can be selected or clicked to perform the drill down navigation. Other similar methods are also contemplated to suit different applications. Further clicking on a corresponding display item generates more information such that the operator can obtain the desired specific information as desired. Other cursor movements of the positional device, such as roll-over or mouse-hover techniques, are contemplated for activating the warning button 36.

In this example, it is contemplated that the visualization unit 30 displays parameters related to a BTX aromatics production complex or process. It will be readily appreciated, however, that the visualization unit 30 may display parameters for other processes of the plant 12a-12n. Other non-limiting example processes include olefin production and naphtha reforming. Other suitable processes are also contemplated to suit different applications. Display configurations may be standardized across various applications, customized for particular applications, or any combination of standardization and customization.

Figure 3A:
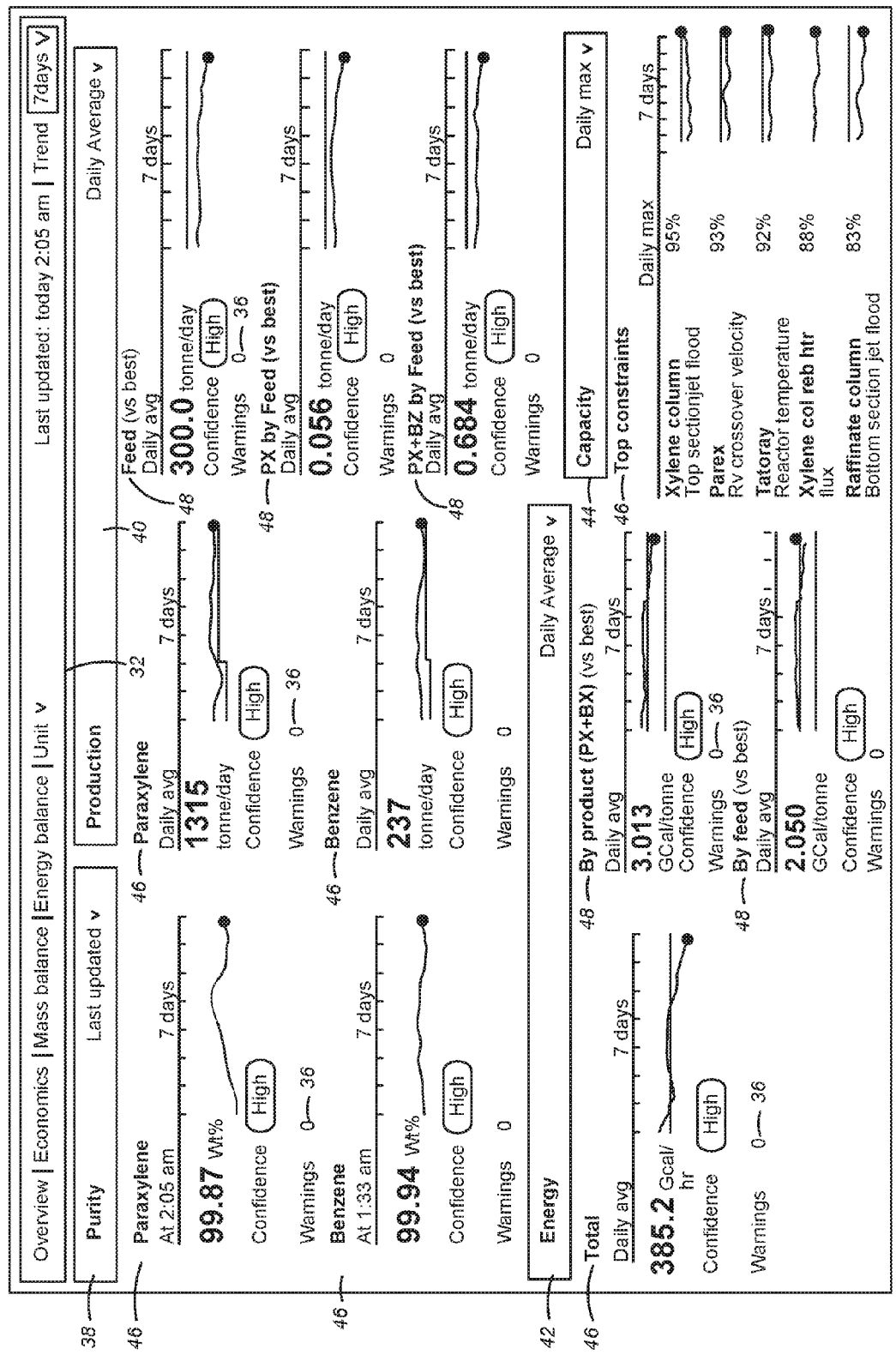
FIGS. 3A-3F illustrate an exemplary alert dashboard used in the present diagnostic system for displaying hierarchical diagnostic data, applied to a Benzene Toluene Xylene (BTX) Aromatics production complex.

FIG. 3A shows the exemplary aromatics alert dashboard 32 illustrating high-level process effectiveness calculations and energy efficiency parameters of the plant 12a along with important operating limits. The operating limits are adaptive or adjustable depending on which parameters are the closest to their limits. For example, each graphical scale or presentation 39 of a corresponding parameter, such as paraxylene or benzene, is adjustable or adaptable in size based on its minimum and maximum values relative to a predetermined time period. More specifically, the operating limits are displayed based on at least one of the operational parameters, such as yields and losses, an energy efficiency, operational thresholds or limits, a process efficiency or purity, and the like. Other suitable parameters are contemplated to suit the application.

In an example embodiment, the alert dashboard 32 has approximately 3-4 window sections (or boxes), each of which includes approximately 1-4 primary component sub-window sections (or boxes) or 1-3 or 3-4 secondary component sub-window sections (or boxes), or a combination of 1-4 primary and 1-4 secondary components in a predetermined standardized window configuration. As an example only, in FIG. 3A, four windows sections are displayed in the alert dashboard 32, namely a PURITY window section 38, a PRODUCTION window section 40, an ENERGY window section 42, and a CAPACITY window section 44. Other suitable combination of primary and/or secondary components are also contemplated to suit different applications.

It is contemplated that a specific location of the corresponding window section 38, 40, 42, 44 in the alert dashboard 32 signifies a priority level of importance relative to one another. In this example, the PURITY window section 38 located in a left top (or upper left) quadrant of the dashboard 32 is the most important section. Then, the PRODUCTION window section 40 is in a right top (or upper right) quadrant of the dashboard 32 is the second important section, the ENERGY window section 42 in a left bottom (or lower left) quadrant of the dashboard 32 is the third important section, and the CAPACITY window section 44 in a right bottom (or lower right) quadrant of the dashboard 32 is the least important section for the aromatics process.

In the PURITY window section 38, two primary component sub-window sections or boxes 46 are displayed for paraxylene (PX) and benzene (BZ). In the PRODUCTION window section 40, in addition to the two primary component sub-window sections 46, three secondary component sub-window sections 48 are displayed for feed, PX by feed, and PX+BZ by feed.

In a similar fashion, the ENERGY window section 42 includes one primary component sub-window section 46 for a total, and two secondary component sub-window sections 48 for product and feed. In the CAPACITY window section 44, one primary component sub-window section 46 is displayed for top constraints.

Each primary component sub-window section 46 may have only one component of the corresponding process, showing a single measurement with related information about the component, or may have two or more components showing a plurality of measurements with the corresponding information for each component. An exemplary arrangement of the sub-window section 46 includes a primary component having three measurements, and a larger primary component (e.g., equal to the height of two primary components) having four measurements. Other suitable arrangements are also contemplated to suit different applications. It is preferred that the alert dashboard 32 has a total of approximately 3 columns and 4-5 rows of information for the primary component sub-window sections 46 and the secondary component sub-window sections 48. Each window sections 38, 40, 42, 44, and its corresponding sub-window sections 46, 48 may have the warning button 36, respectively, for displaying the hierarchical diagnostic data related to each component. Other suitable arrangements of the columns and rows are contemplated depending on sizes of the display device 20 and the dashboard 32.

It is preferred that warning button 36 is activated or displayed based on an information type of each component. For example, a secondary component (Info Type) is used to display measures that are not connected to the fault model, and provides context to other components that are connected to the fault model. As such, the measurement number and the Current Value dot at the end of the trend line is displayed visually in gray color. It is contemplated that only the secondary component can be the Info Type, and the primary components are connected to the fault model. Thus, when the corresponding component is the Info Type, this component does not have the warning button 36 because there is no troubleshooting information to be accessed.

Figure 3B:
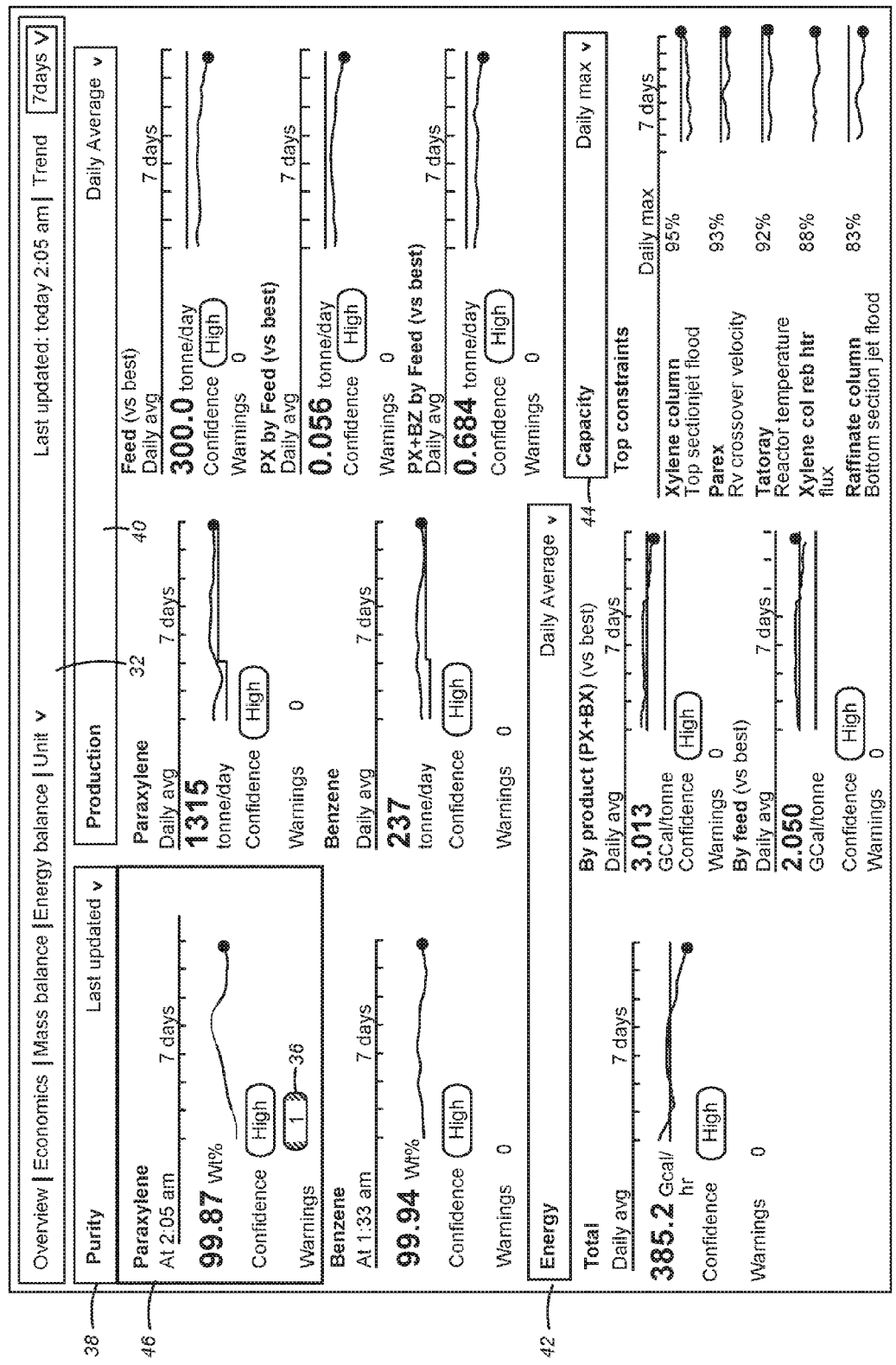

In this example, as illustrated in FIG. 3B, when the detection unit 22 detects at least one faulty condition in the paraxylene component sub-window section 46 of the PURITY window section 38 for the aromatics alert dashboard 32, the warning button 36 changes its color to indicate a severity level of the associated warning. Further, it is contemplated that the warning button 36 includes a numerical indicator showing a total number (e.g., 1, 2, 3, etc.) of faulty conditions related to the paraxylene component of the aromatics process. It is further contemplated that as the number of detected faulty conditions increases, the numerical indicator also increases its number.

For example, a first color RED is used for critical warnings associated with the parameter values of sensors operating out of a predetermined range (e.g., minimum or maximum values). A second color YELLOW or AMBER is used for cautionary warnings associated with the parameter values of sensors operating within the predetermined range but out of a normal operative range.

In one embodiment, it is contemplated that the first color RED indicates the faulty condition in a parent or top level of a corresponding hierarchical fault model, and the second color YELLOW or AMBER indicates the faulty condition in a child or lower level of the corresponding hierarchical fault model. As an example only, when the measure in the KPI component itself is in fault, a related graphical representation, such as a corresponding parameter value 37A or a dot 37C at an end of a trend line 39, and a portion of the trend line where the measurement is in fault, is displayed in the first color RED. However, when the lower level is in the faulty condition, the associated faulty items are displayed in the second color YELLOW or AMBER. In this case, a value in the warning button 36 may show "1" or a higher number, indicating that there are one or more faulty conditions in the lower level, but if the KPI measure itself (e.g., PURITY) is not in the faulty condition, all parent items will be displayed in the second color YELLOW or AMBER instead of the first color RED. Other different uses of the color schemes are contemplated to suit different applications.

Figure 3C:
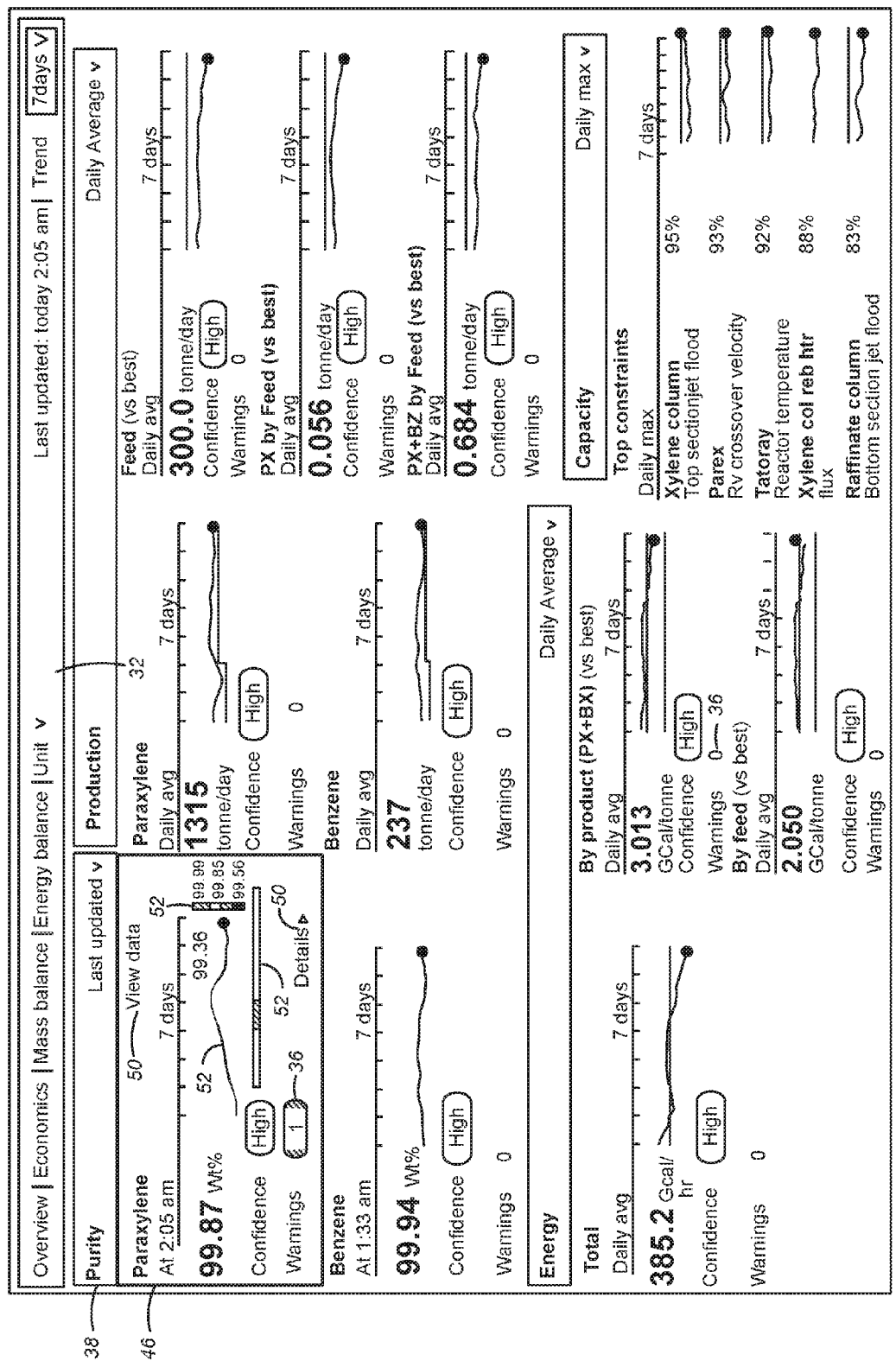

In FIG. 3C, when the warning button 36 having the numerical indicator showing "1" is selected or clicked by the operator, a view data or detail button 50 is disposed in the paraxylene component sub-window section 46. It is also contemplated that the view data or detail button 50 has a function to selectively download or upload the data displayed in the sub-window section 46 for importing the data into other software programs (e.g., spreadsheet or word processing software). In one embodiment, another feature for downloading additional pre-defined sets of related data may be incorporated into the functionality of the view data or detail button 50. It is contemplated that the download feature may be incorporated into a separate button or graphical representation to suit different applications.

It is preferred that at least one graphical representation 52 is provided, designed for illustrating changes in the paraxylene component during a predetermined sampling period. It is contemplated that the faulty condition is indicated using the color and hue techniques. It is preferred that the displayed graphical representation 52 includes time-based information in the form of miniature trends adjacent to associated parameter values.

It is also contemplated that additional informational lines can be displayed with the trend lines. For example, a gray, stepped line in the paraxylene and benzene Production components can represent a desired target for that measurement. Alternatively, a straight green line in other boxes in the Production section can represent a previous "best" performance for that measurement over a set period of time.

In this example, the graphic representation 52 has the sampling period of 7 days, but other sampling periods, such as 3 days or 30 days, are also contemplated to suit the application.

Figure 3D:
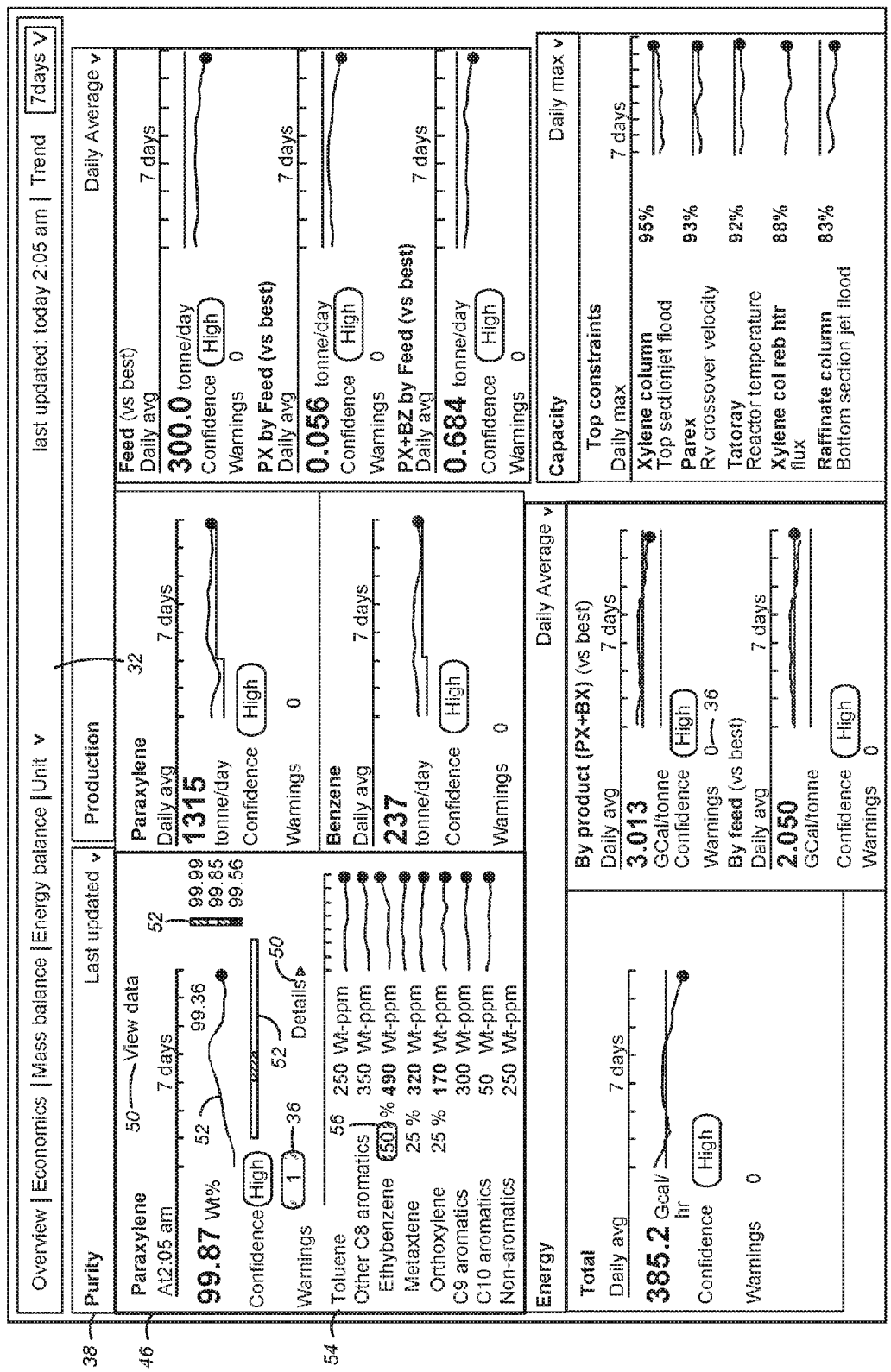

In FIG. 3D, when the view data or detail button 50 is activated by the operator, the paraxylene component sub-window section 46 automatically expands to create a detail pane 54 for facilitating the display of detailed data related to the faulty conditions. In this example, the paraxylene component sub-window section 46 expands downwardly to show sublevel display items in the detail pane 54, featuring all impurity components related to the paraxylene purity.

Specifically, the parameter values associated with Toluene, C8 Aromatics, C9 Aromatics, C10 Aromatics, and Non-Aromatics are shown in the detail pane 54 of the sub-window section 46. Other suitable parameter values are also contemplated to suit different applications, for example, component yields and losses, an energy efficiency, operational limits, speed limits or flow rates, and a process efficiency, and the like. Utility inputs and outputs, such as steam, gas, and electricity, and utility outputs, can also be displayed in the alert dashboard 32 as desired.

As discussed above, when the detection unit 22 identifies the faulty conditions, the systematic drill down navigation is performed to identify the set of potential root causes of the process disruptions and poor process operations. In this example, the ethylbenzene component is identified as the root cause of the faulty condition because a component ratio of ethylbenzene is increased to 50 percent when compared to the ratio measured 2 days ago.

Figure 3E:
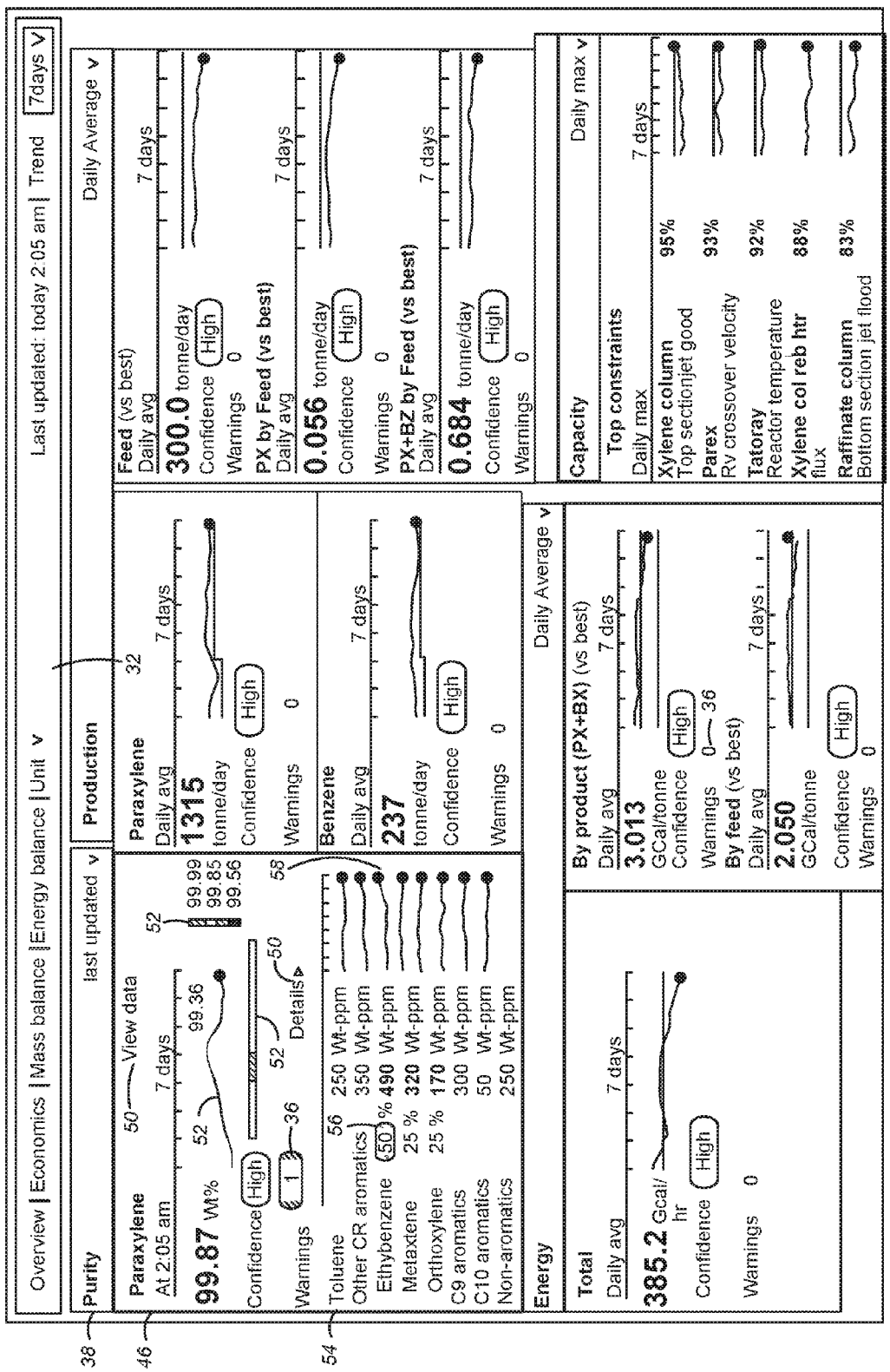

In FIG. 3E, for this sublevel display item, i.e., ethylbenzene, a warning marker 56 is displayed to readily identify the root cause of the faulty condition. It is preferred that the sublevel display item having the warning marker 56 is highlighted in a different color (e.g., gray or blue) to distinguish the item from background.

An arrow button 58 is provided for navigating downwardly to and automatically creating an action pane 60 (FIG. 3F) having more detailed descriptions about the corresponding higher level display item. Additional drill down navigations are contemplated, and conversely, upward navigations to the corresponding higher level display items are also contemplated to suit the application.

In another embodiment, the drill down navigation capability may be incorporated into any other graphical representation, such as the number 37A, the confidence button 37B, or the warning button 36, to display the more detailed descriptions. The remaining features of this depicted embodiment are the same or similar to the preceding embodiment(s) described in more detail above and the same reference numbers are used. Those portions of the preceding embodiment(s) relating to the remaining features are incorporated by reference herein. While all boxes, windows, and panes are shown on the same dashboard, other supplemental display configurations, such as independent pop-up windows and semi-transparent layered boxes, are also contemplated.

Figure 3F:
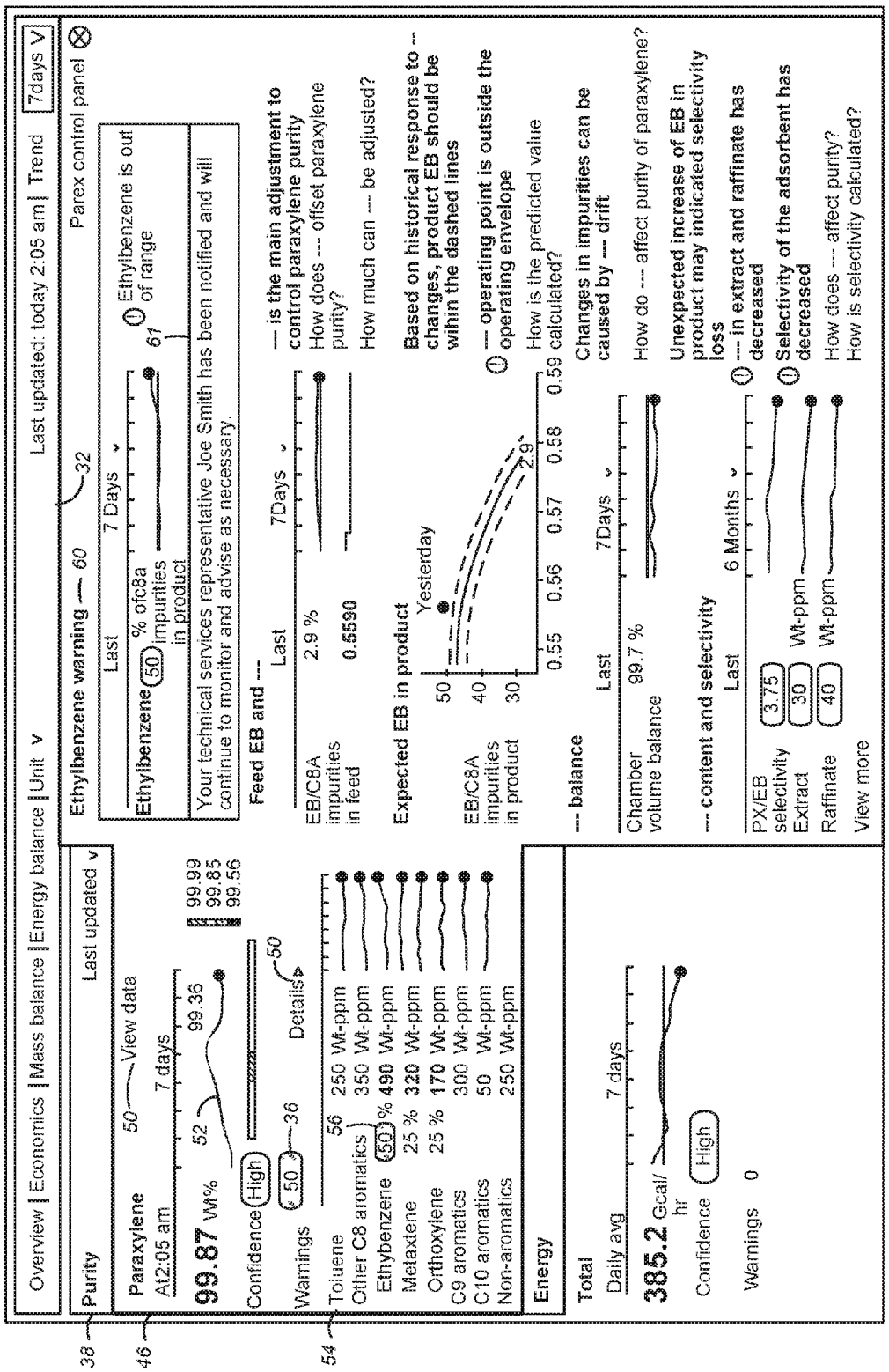

In FIG. 3F, when the arrow button 58 is selected or clicked by the operator, the action pane 60 is displayed for illustrating the detailed information about the ethylbenzene component shown in the detail pane 54. In this example, the action pane 60 includes an ethylbenzene warning describing the faulty condition of C8 Aromatics impurities in end products. In another embodiment, another graphical representation, such as the number 37A, the confidence button 37B, or the warning button 36, may be selected or clicked to illustrate the detailed information in a separate screen or window. While a box shape is shown for the example action pane 60, other suitable geometric shapes are contemplated to suit different applications.

As the component ratio of ethylbenzene exceeds a predetermined threshold and thus is out of range, the alert unit 34 notifies a specific technical service representative for further analysis, which is indicated in the action pane 60 via a notification display 61. In the meantime, the present system 10 continues to monitor the aromatics process, and provides additional advice to the operator as needed.

As a result, further advantage is achieved by utilizing the standardized display configuration for the alert dashboard 32 that clearly establishes links between processes and faulty conditions. As all process, analytical, and economic data are used to provide reports that are linked through process and reference models, all operators can effectively communicate and make decisions from a common set of information, thereby driving the whole organization to focus on continuous economic performance maximization.

For an alternative process, such as an olefin production process, the action pane 60 could provide a propane conversion warning in a separate window or pane, including general information for how reactor conditions can affect the propane consumption. For example, an action pane could provide information about reactors (e.g., Reactor 1 and Reactor 2) used for the process, and indicate whether the reactors are in a critical condition because, for instance, the reactors exceed a predetermined differential temperature threshold of 50° C. As another example, a general information of how calculated values can affect propane consumption is displayed in another separate window or pane. For example, the action pane 60 provides information about the process conditions. Here, a catalyst condition, a fired heater health condition, a suction pressure condition, and the like, are displayed for the operator's review. In a naphtha reforming process, the displayed action pane 60 can, for instance, describe a recycle gas $H_2$ purity warning.

Referring now to FIGS. 4A-4E, an exemplary fluid catalytic cracking (FCC) key performance indicator (KPI) alert dashboard 62 is shown. An overall configuration of the FCC KPI alert dashboard 62 is similar to the aromatics alert dashboard 32 shown in FIGS. 3A-3F. However, in this example, the PRODUCTION window section 40 is displayed in the left top quadrant of the dashboard 62 to signify the highest priority level of importance for the FCC chemical process.

A YIELDS & QUALITY window section 64 is disposed in the right top quadrant of the dashboard 62 as the second important section for the FCC chemical process. As with the aromatics alert dashboard 32, the ENERGY window section 42 is disposed in the left bottom quadrant of the dashboard 62 as the third important section, and a TOP CONSTRAINTS window section 66 is disposed in the right bottom quadrant of the dashboard as the least important section for the FCC chemical process.

Figure 4A:
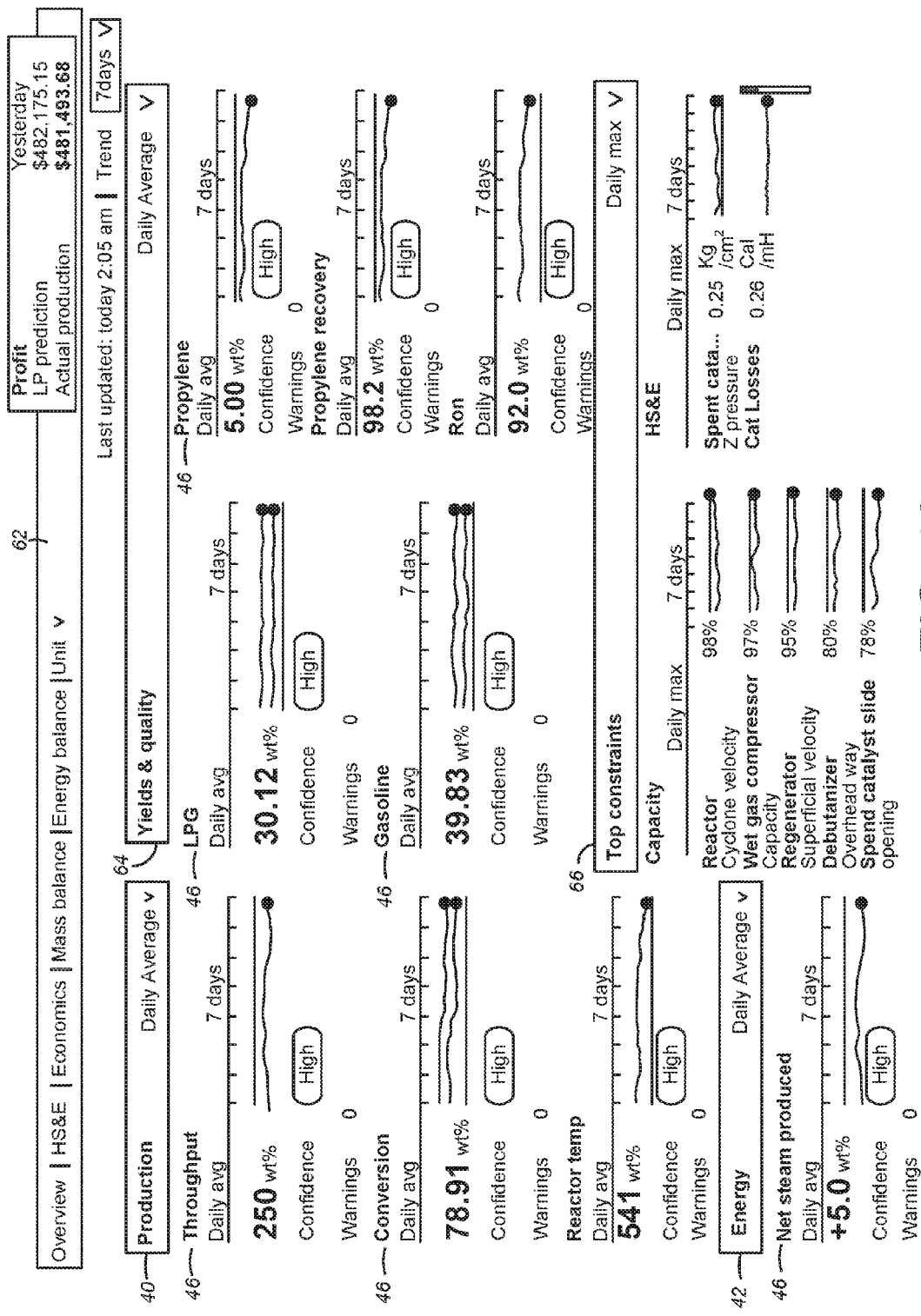
FIGS. 4A-4E illustrate an exemplary fluid catalytic cracking (FCC) process key performance indicator (KPI) alert dashboard used in the present diagnostic system for displaying hierarchical diagnostic data, where the dashboard in FIG. 4E is presented in a portrait aspect ratio.
Figure 4B:
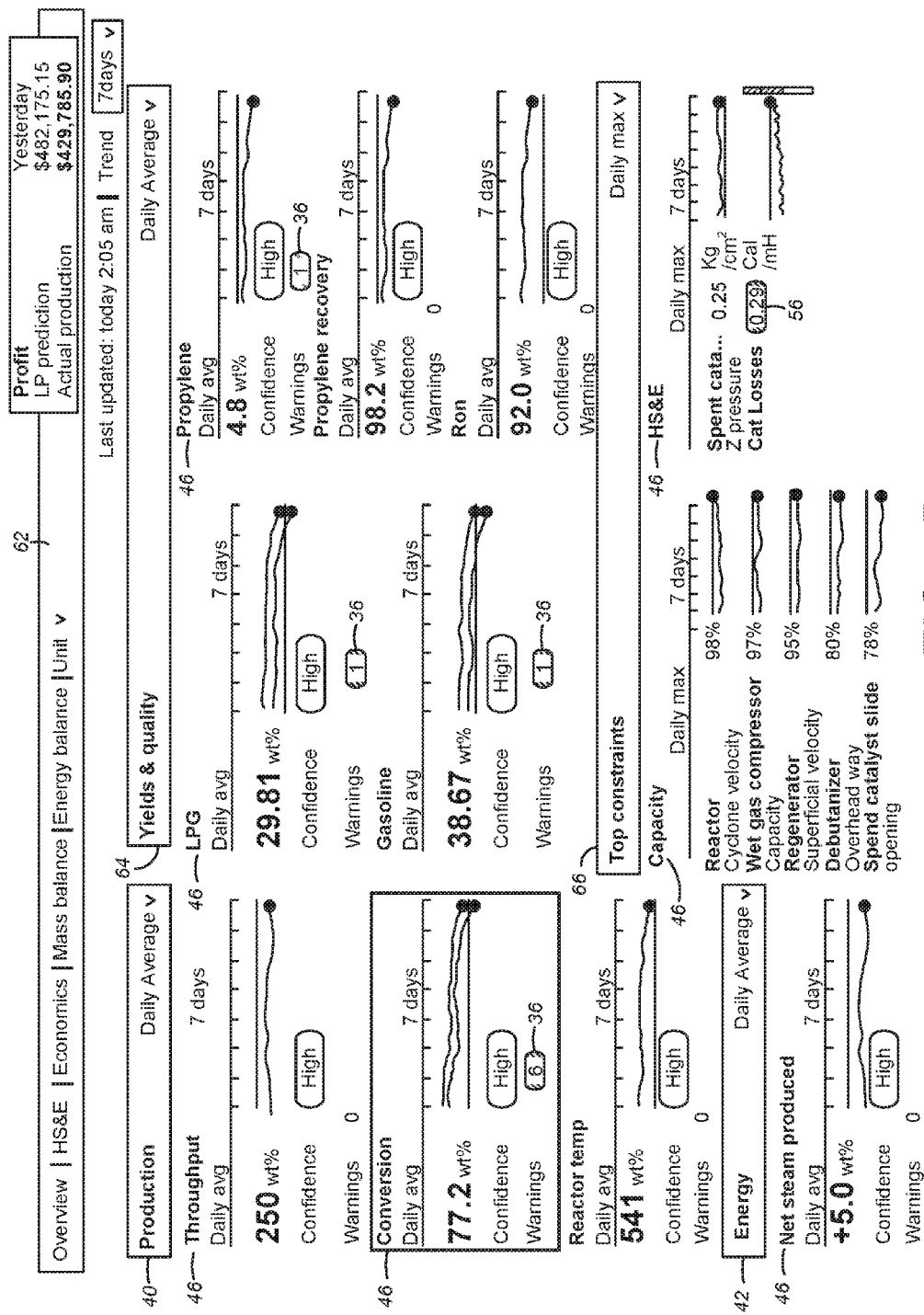

In FIG. 4B, the warning button 36 in the conversion component sub-window section 46 indicates six (6) critical level warnings. Similarly, the warning button 36 in a liquid propane gas (LPG) sub-window section 46 indicates one (1) critical level warning, and the warning button in a gasoline sub-window section indicates one (1) critical level warning. Also, the warning button 36 in a propylene sub-window section 46 indicates one (1) cautionary level warning, and the warning marker 56 in a health safety and environment (HS&E) sub-window section 46 indicates one (1) cautionary level warning. In one embodiment, it is contemplated that the cautionary level warning may refer to a warning condition not indicative of the faulty condition illustrated in the first color RED or the second color YELLOW or AMBER. Rather, the cautionary level warning may indicate a warning level of the faulty condition between the first color RED and the second color YELLOW or AMBER. In another embodiment, it is contemplated that a view-all button is provided in the sub-window section 46 or any other suitable portion of the dashboard 62 to display all related information associated with the corresponding parameter values in a separate screen or window.

In this example, there are two levels of warnings, namely the critical level warning and the cautionary level warning. The critical level warning is depicted in the color RED and the cautionary level warning is depicted in the color YELLOW. The color RED signifies a higher level of priority, and the color YELLOW signifies a lower level of priority.

Figure 4C:
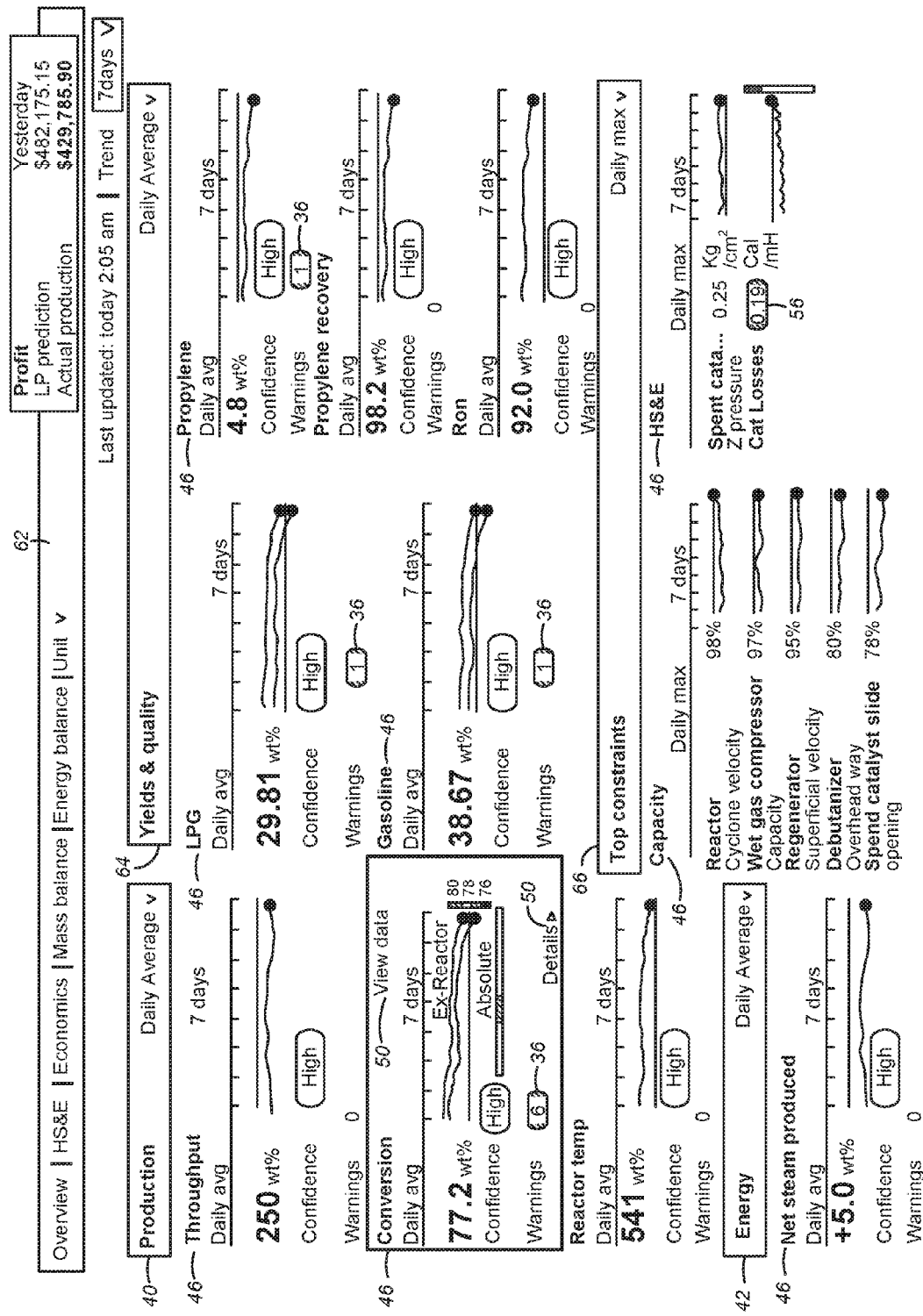

In FIG. 4C, as similarly with the aromatics alert dashboard 32, when the warning button 36 in the conversion component sub-window section 46 is selected or clicked by the operator, the view data or detail button 50 is displayed.

Figure 4D:
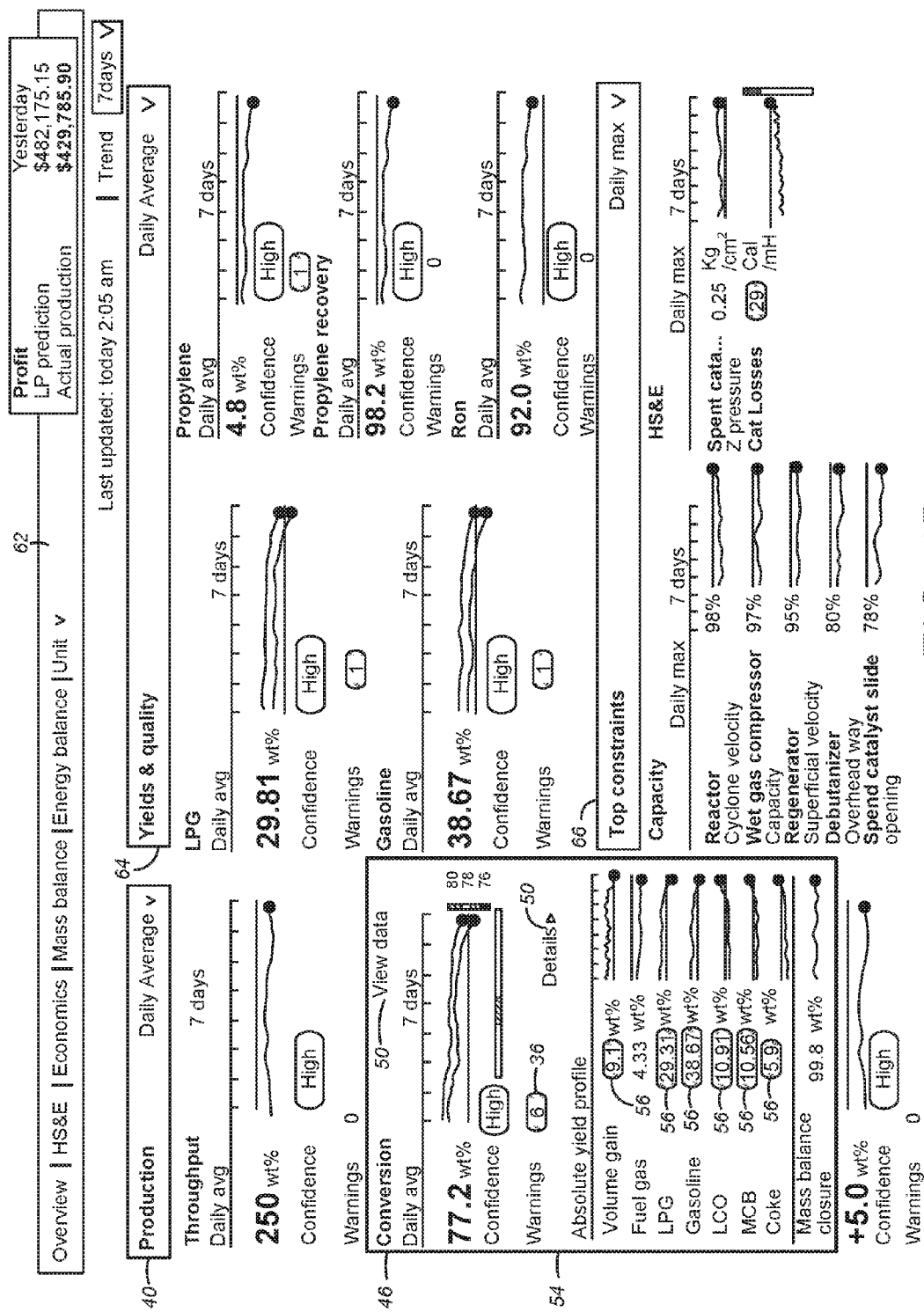

In FIG. 4D, when the view data or detail button 59 is selected, six (6) warning markers 56 having the parameter values associated with the 6 critical level warnings are shown in the detail pane 54 of the sub-window section 46, namely Volume Gain, LPG, Gasoline, Light Cycle Oil (LCO), Main Column Bottom (MCB), and Coke.

Figure 4E:
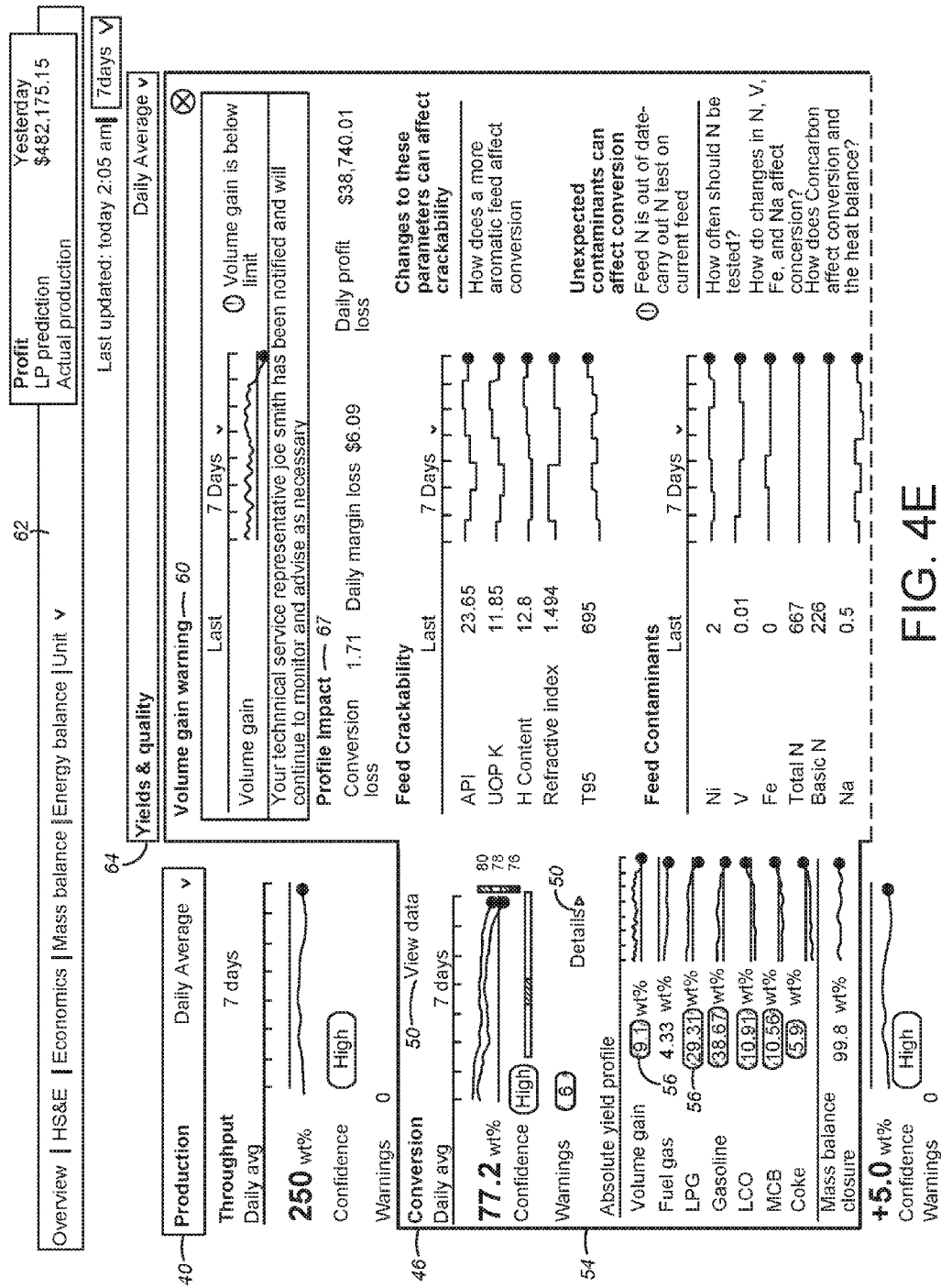
Figure 4E:
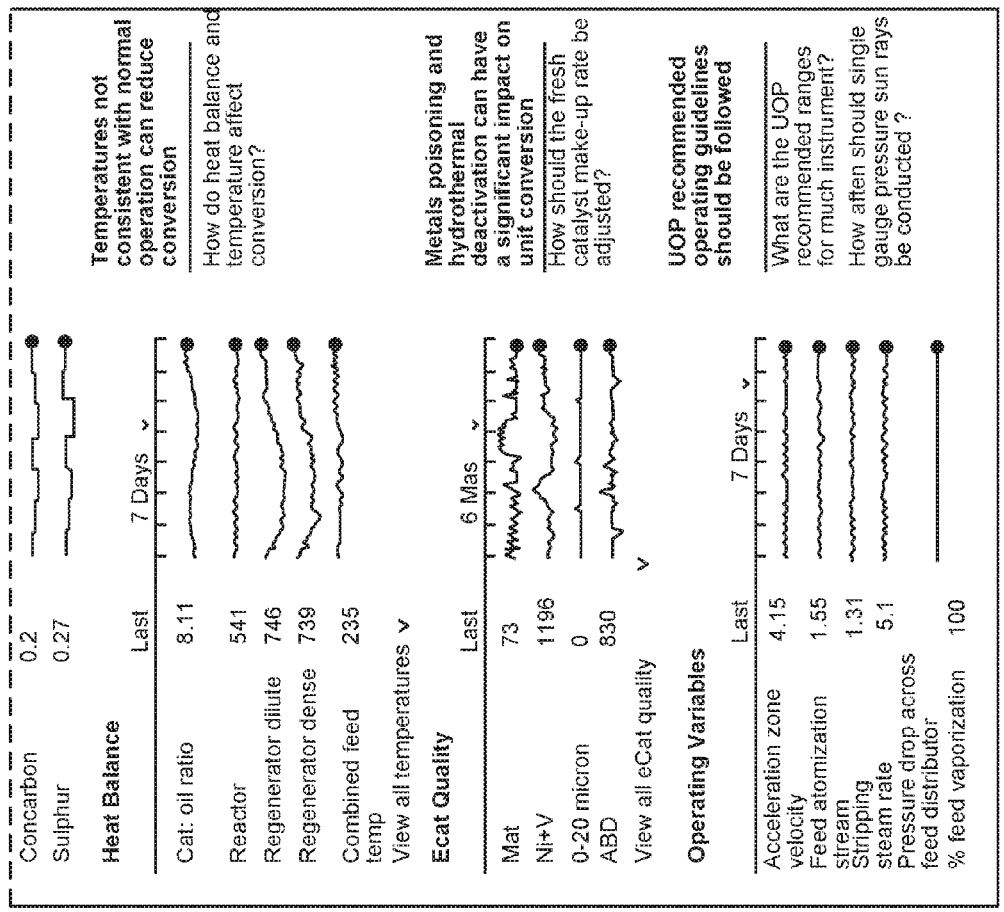

In FIG. 4E, as described above, it is contemplated that one of the warning markers 56 may be selected or clicked by the operator. For example, the warning marker 56 of the sub-level display item for volume gain component is selected. At that moment, the action pane 60 is displayed for illustrating the detailed information about the Volume Gain component shown in the detail pane 54 as shown in FIG. 4E. In this example, the action pane 60 includes a Volume Gain warning describing the faulty condition of low Volume Gain for the FCC chemical process.

In a preferred embodiment, the action pane 60 also includes a profit impact information pane 67 designed for displaying an itemized profit impact list having at least one of a conversion loss, a daily margin loss, and a daily profit loss. For example, the analysis unit 28 calculates a monetary amount of the daily profit loss based on the faulty condition(s).

Figure 5:
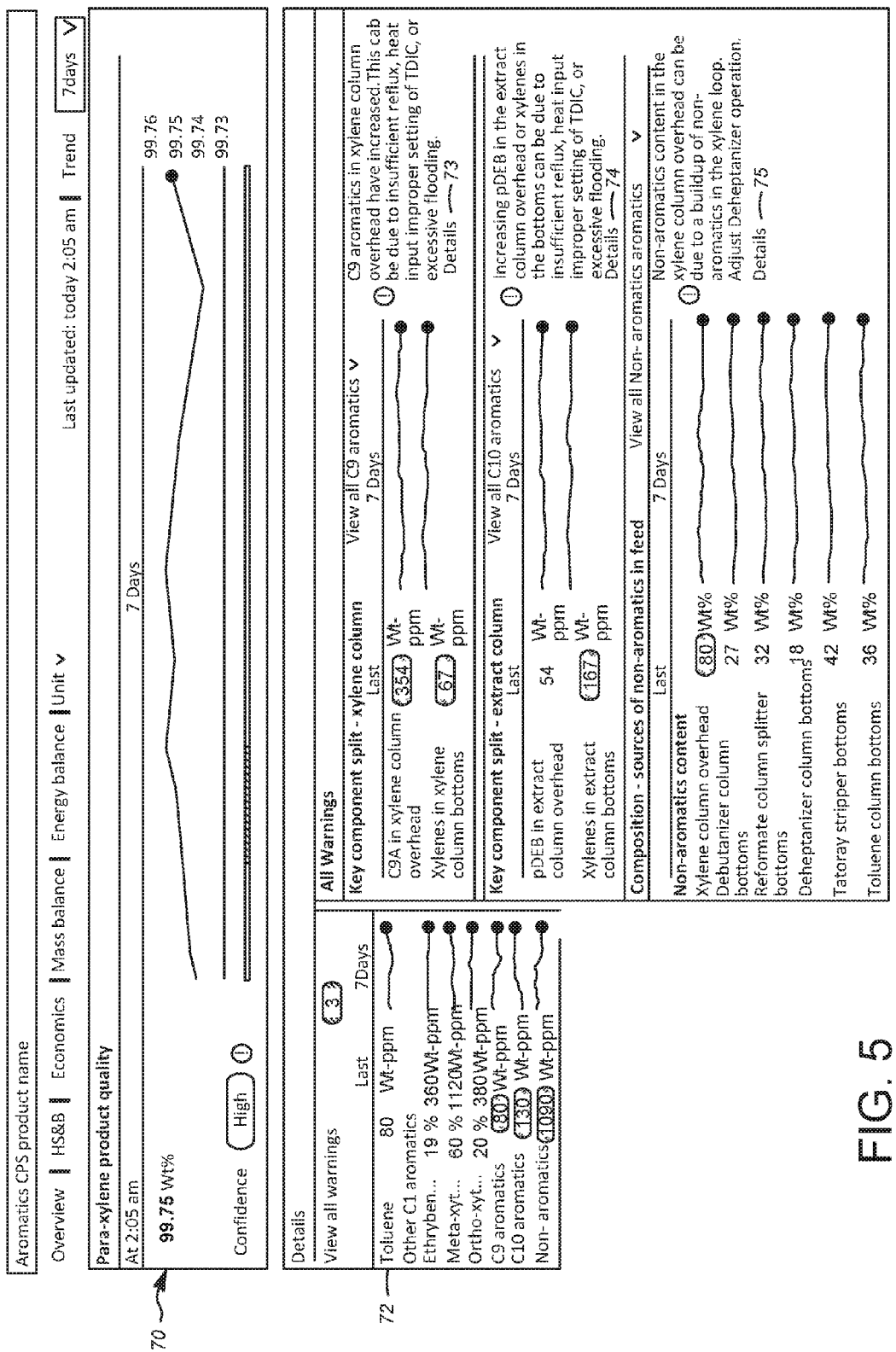
FIG. 5 illustrates an exemplary action panel for an aromatic process alert dashboard, in which several warnings are displayed.
Figure 6:
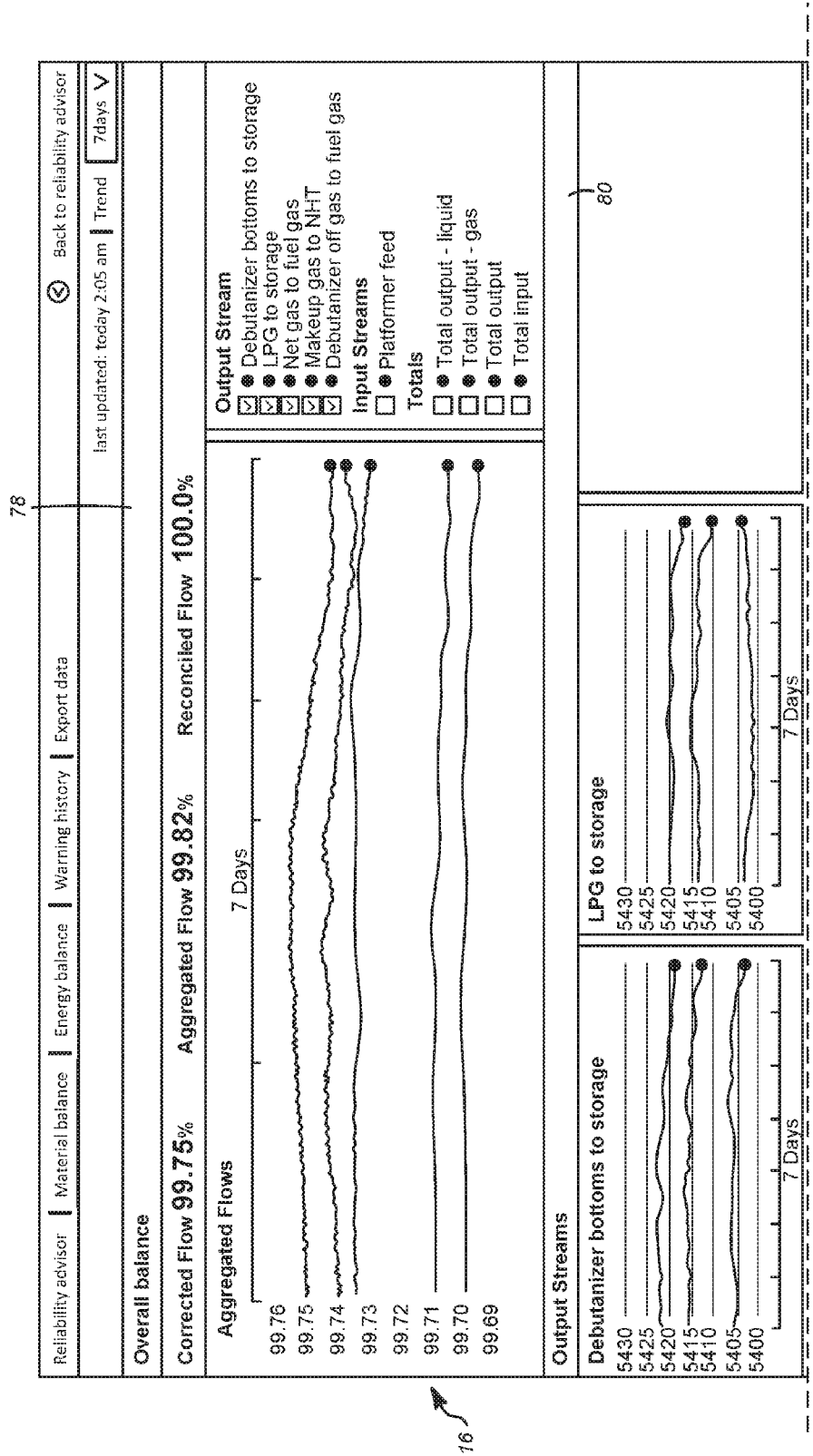
FIG. 6 illustrates an exemplary alert dashboard depicting an overall mass balance and input and output streams.
Figure 6:
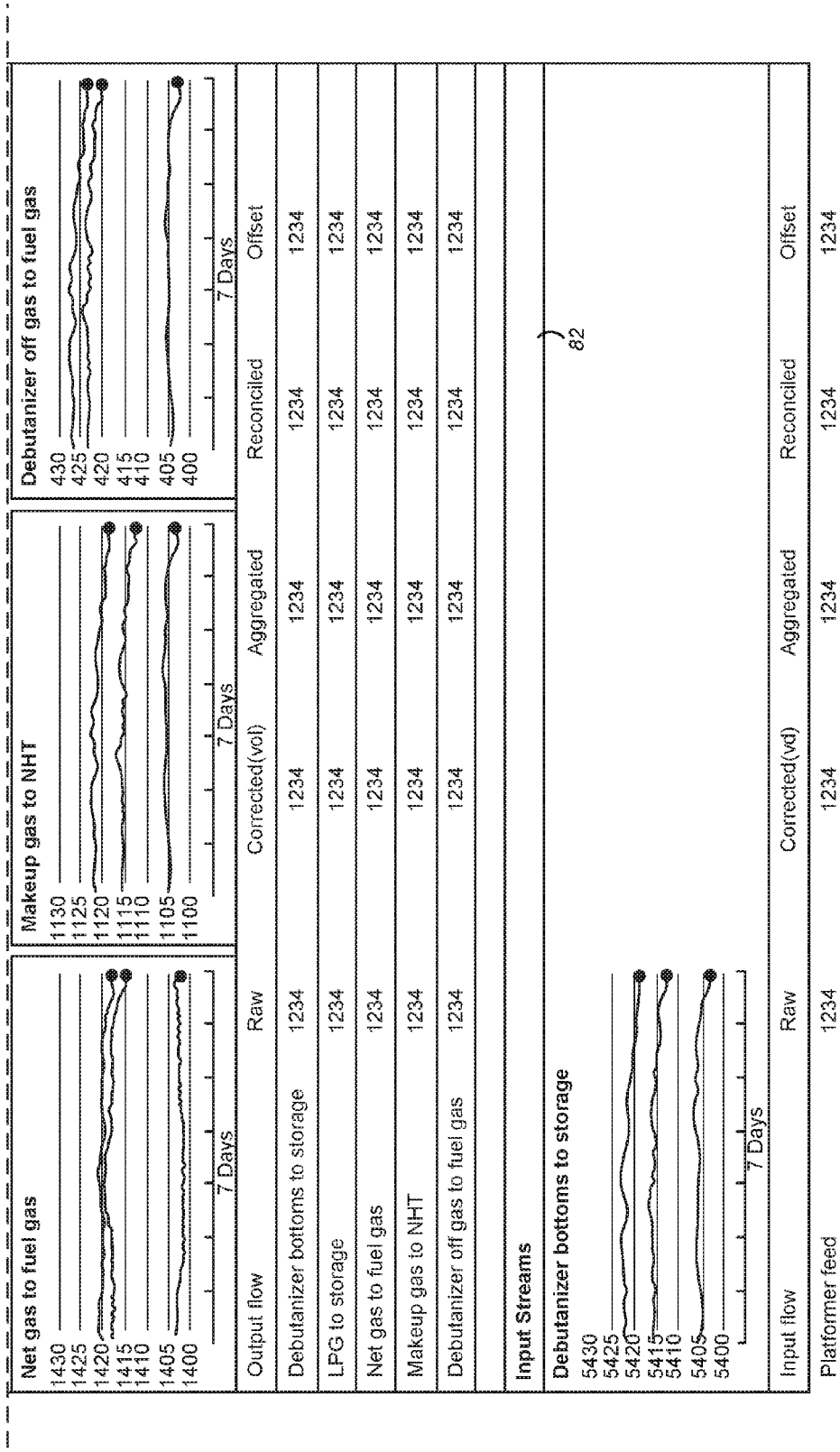
Figure 7:
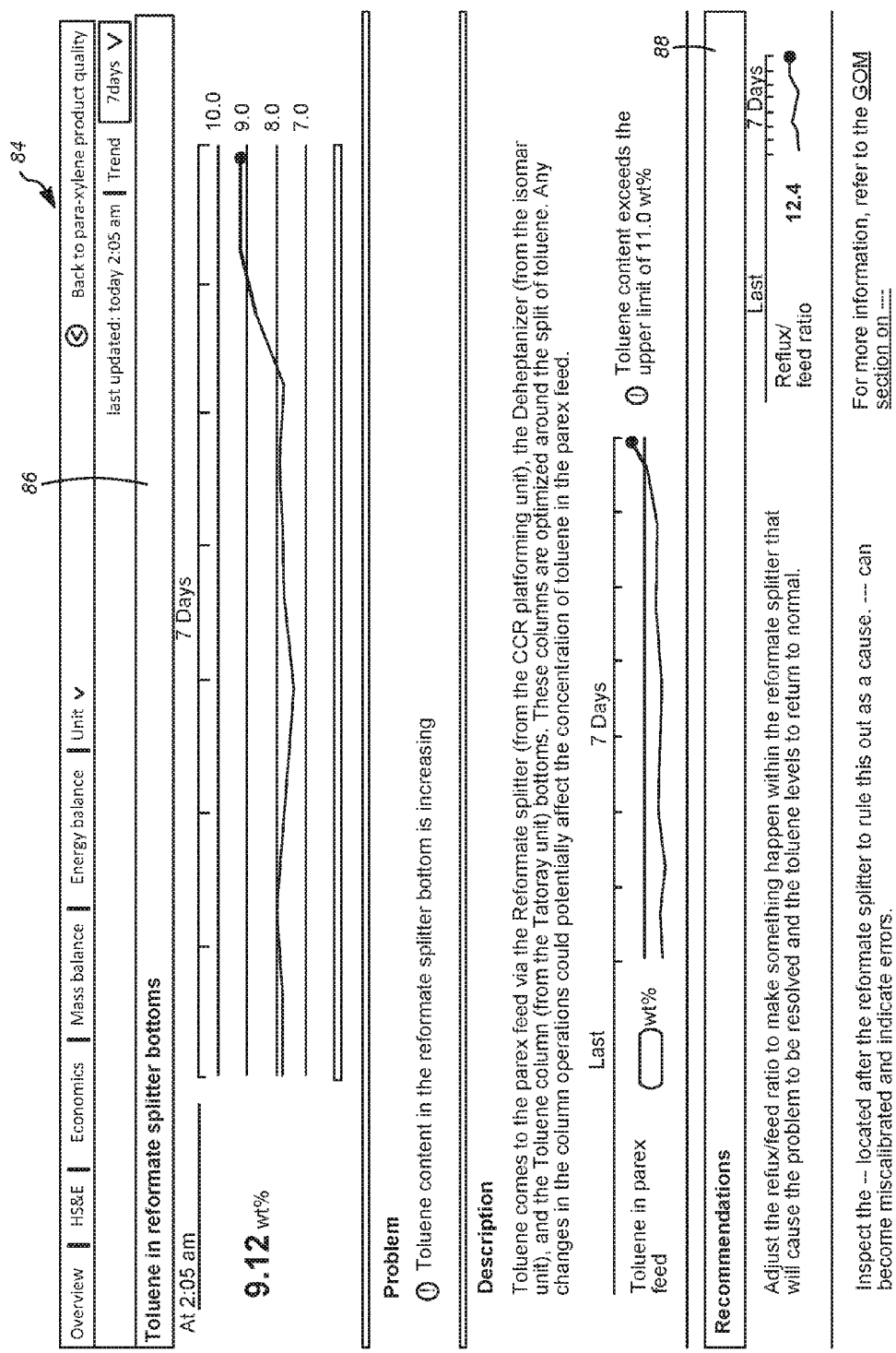
FIG. 7 illustrates an alternative action panel for an alert dashboard, including a problem description, recommendations, and related warnings.
Figure 7:
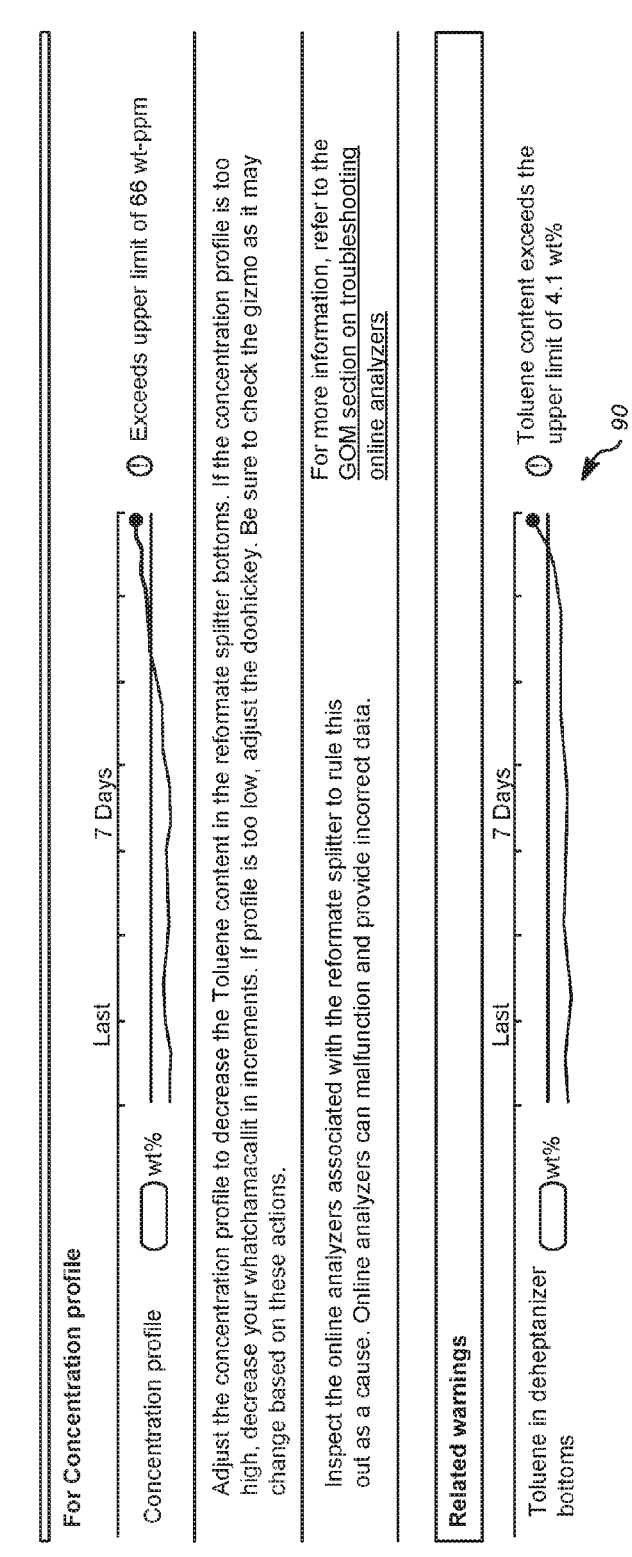
Figure 8:
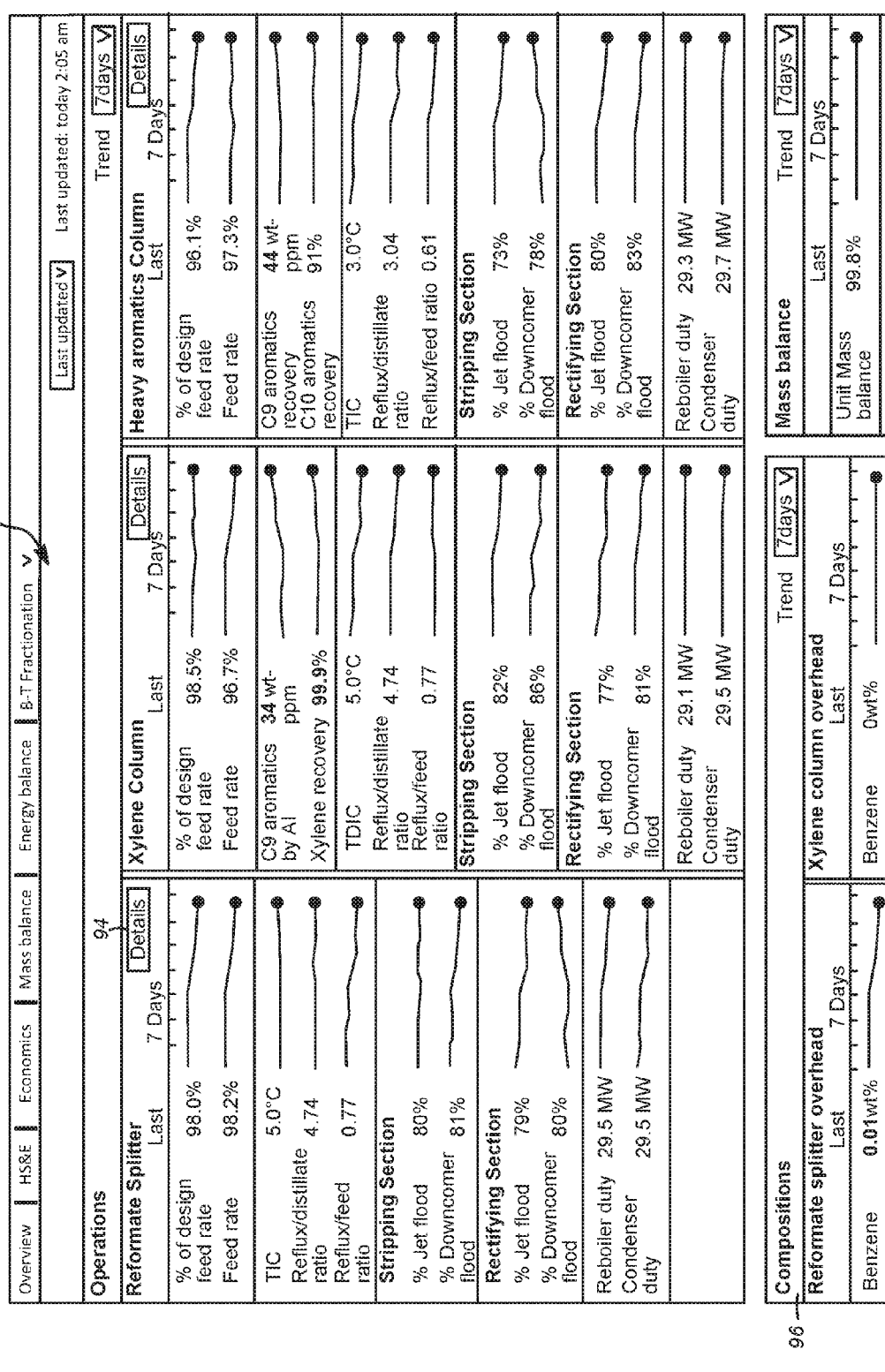
FIG. 8 illustrates a panel of an alert dashboard, depicting xylene fractionation details.
Figure 8:
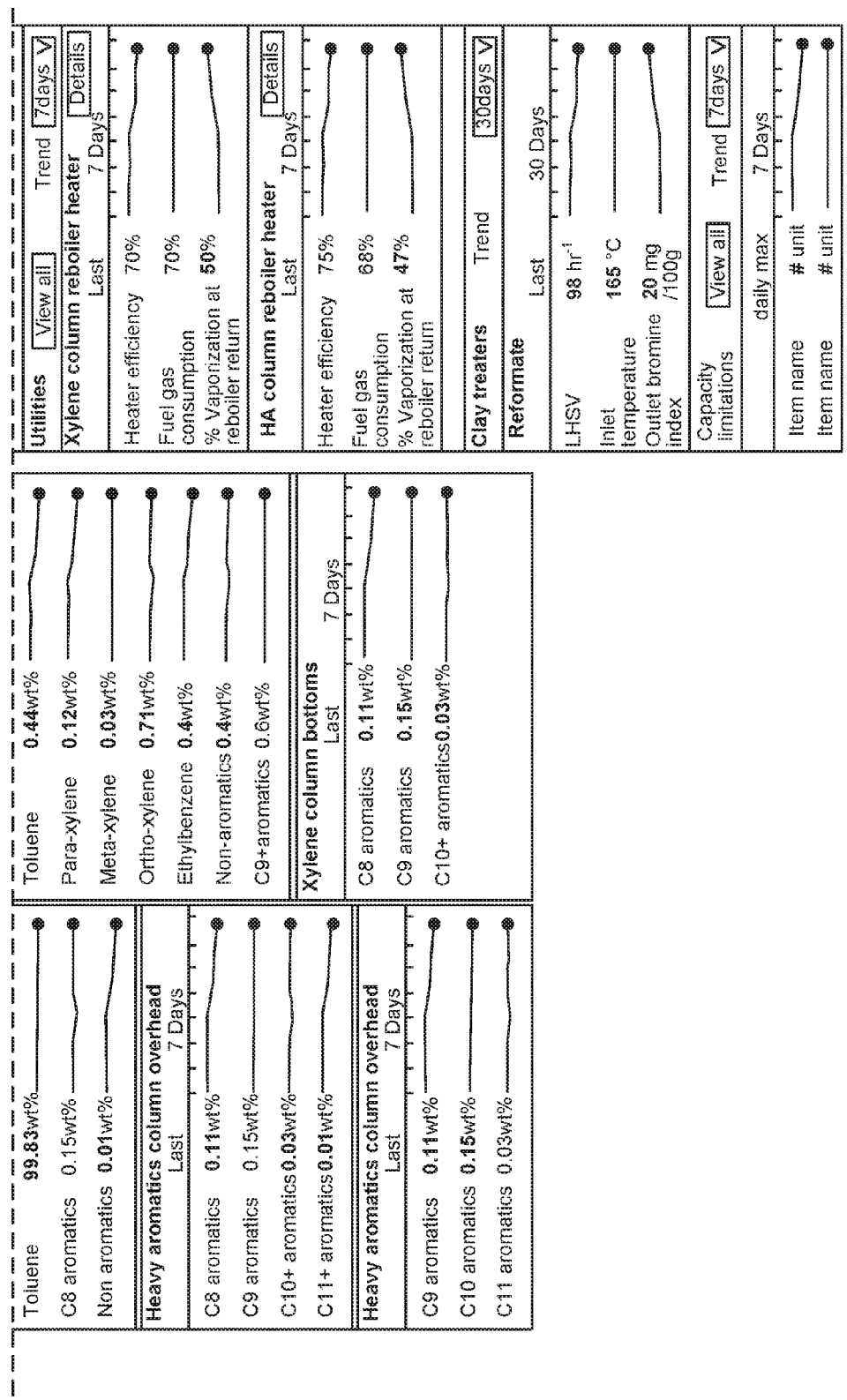

FIGS. 5-8 illustrate additional example displays for alert dashboards. In FIG. 5, a paraxylene dashboard 70 is shown for an aromatics process, in which a detail panel 72 is provided indicating various parameters. Also shown are all (in this example, three) active warnings 73, 74, 75 affecting para-xylene product quality. FIG. 6 shows a dashboard 76 in a portrait aspect ratio, depicting an overall material balance 78 and various output streams 80 and input streams 82. FIG. 7 illustrates an alternative action panel 84 for an alert dashboard, including a problem description 86, detailed text recommendations 88, and related warnings 90, presented textually and using icons. FIG. 8 illustrates a xylene fractionation panel 92 of an alert dashboard, numerically and graphically depicting various xylene fractionation process details, including operations 94 and compositions 96.

While the following is described in conjunction with specific embodiments, it will be understood that this description is intended to illustrate and not limit the scope of the preceding description and the appended claims.

A first embodiment of the invention is a diagnostic system for diagnosing a process of a plant, using a computing device, the system comprising a detection unit configured for automatically detecting a faulty condition of the process based on a plurality of readings of parameters or measurements associated with the faulty condition for alerting an operator; an analysis unit configured for determining an operating status of the plant based on the plurality of readings of parameters or measurements; a display device configured for graphically linking the faulty condition with the plurality of readings of parameters or measurements; a visualization unit configured for displaying the operating status of the plant with the readings of parameters or measurements using an alert dashboard grouping related data based on a source of the data for meaningfully illustrating relationships of the displayed data; and an alert unit configured for automatically generating a warning message based on the plurality of readings of parameters or measurements to inform the operator of the faulty condition. An embodiment of the invention is one, any or all of prior embodiments in this paragraph up through the first embodiment in this paragraph, further comprising an interface module configured for providing an interface between the diagnostic system and other related system devices, services, and applications via a computer network. An embodiment of the invention is one, any or all of prior embodiments in this paragraph up through the first embodiment in this paragraph, wherein the detection unit identifies a causal relationship that leads to finding a root cause of the faulty condition. An embodiment of the invention is one, any or all of prior embodiments in this paragraph up through the first embodiment in this paragraph, wherein the plurality of readings of parameters or measurements are related to at least one of a process model, a kinetic model, a parametric model, an analytical tool, and a related knowledge and best practice standard. An embodiment of the invention is one, any or all of prior embodiments in this paragraph up through the first embodiment in this paragraph, wherein the analysis unit generates a process decision tree based on at least one of an expert knowledge and a causal relationship between the faulty condition and corresponding parameters or measurements. An embodiment of the invention is one, any or all of prior embodiments in this paragraph up through the first embodiment in this paragraph, wherein the display device includes a human machine interface configured for receiving an input signal from the operator to graphically or textually interact with the diagnostic system using the alert dashboard.

A second embodiment of the invention is an alert dashboard for displaying a plurality of readings of parameters or measurements associated with a faulty condition of a process of a plant, the alert dashboard comprising at least one window section including at least one primary component sub-window section in a predetermined standardized window configuration; and at least one warning button disposed in at least one of the at least one window sections, and configured for performing a hierarchical navigation relating to each faulty condition displayed in the corresponding window section, wherein a specific location of the corresponding window section in the alert dashboard signifies a priority level of importance relative to one another. An embodiment of the invention is one, any or all of prior embodiments in this paragraph up through the second embodiment in this paragraph, wherein the at least one window section includes at least one secondary component sub-window section. An embodiment of the invention is one, any or all of prior embodiments in this paragraph up through the second embodiment in this paragraph, wherein the alert dashboard has a left top quadrant, a right top quadrant, a left bottom quadrant, and a right bottom quadrant, each quadrant being located based on the priority level. An embodiment of the invention is one, any or all of prior embodiments in this paragraph up through the second embodiment in this paragraph, wherein the left top quadrant is the most important section, the right top quadrant is the second most important section, the left bottom quadrant is the third most important section, and the right bottom quadrant is the least important section for the process. An embodiment of the invention is one, any or all of prior embodiments in this paragraph up through the second embodiment in this paragraph, wherein each primary component sub-window section has only one component of the process, showing a single measurement with related information about the component. An embodiment of the invention is one, any or all of prior embodiments in this paragraph up through the second embodiment in this paragraph, wherein each primary component sub-window section has at least two components showing the plurality of readings of parameters or measurements for the component. An embodiment of the invention is one, any or all of prior embodiments in this paragraph up through the second embodiment in this paragraph, wherein the warning button changes a color of the button for indicating a severity level of the associated warning using a color and hue technique. An embodiment of the invention is one, any or all of prior embodiments in this paragraph up through the second embodiment in this paragraph, wherein the warning button has a numerical indicator showing a total number of faulty conditions related to the process. An embodiment of the invention is one, any or all of prior embodiments in this paragraph up through the second embodiment in this paragraph, wherein a first color of the warning button denotes a critical warning associated with the faulty condition. An embodiment of the invention is one, any or all of prior embodiments in this paragraph up through the second embodiment in this paragraph, wherein a second color of the warning button denotes a cautionary warning associated with the faulty condition. An embodiment of the invention is one, any or all of prior embodiments in this paragraph up through the second embodiment in this paragraph, wherein a detail button is disposed in the corresponding window section for facilitating a hierarchical display of detailed data related to the faulty condition. An embodiment of the invention is one, any or all of prior embodiments in this paragraph up through the second embodiment in this paragraph, wherein when the detail button is activated, the corresponding sub-window section automatically expands to create a detail pane for facilitating the display of detailed data related to the faulty condition. An embodiment of the invention is one, any or all of prior embodiments in this paragraph up through the second embodiment in this paragraph, wherein a view data button is disposed in the corresponding window section for importing the data into other related systems. An embodiment of the invention is one, any or all of prior embodiments in this paragraph up through the second embodiment in this paragraph, wherein at least one graphical representation is provided in the corresponding window section for illustrating time-based information related to the process during a predetermined sampling period. An embodiment of the invention is one, any or all of prior embodiments in this paragraph up through the second embodiment in this paragraph, wherein an action pane having detailed descriptions about a corresponding higher level display item is displayed in the alert dashboard for finding a root cause of the faulty condition.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While a particular embodiment of the present diagnostic system has been described herein, it will be appreciated by those skilled in the art that changes and modifications may be made thereto without departing from the invention in its broader aspects and as set forth in the following claims.

What is claimed is:

1. A diagnostic system for diagnosing a process of a plant, using a computing device, the diagnostic system comprising:
   a detection unit configured for automatically detecting a faulty condition of the process based at least on data derived from a plurality of readings of parameters or measurements associated with the faulty condition for alerting an operator, wherein said automatically detecting comprises:
      obtaining the data;
      generating, using at least one simulation, a plant process model that estimates or predicts expected performance of the plant based on the obtained data, the plant process model including one or more model values;
      comparing the one or more model values to one or more of the obtained data to calculate one or more offsets; and
      detecting an error based on the calculated one or more offsets;
   an analysis unit configured for determining an operating status of the plant based at least on the data and the detected error;
   a display device configured for displaying the data and for graphically linking the faulty condition with the data;
   a visualization unit configured for displaying the operating status of the plant with the data using an alert dashboard that visually groups the displayed data into related groups based on a source of the data for meaningfully illustrating relationships of the displayed data; and
   an alert unit configured for automatically generating a warning message based at least on the data to inform the operator of the faulty condition.

2. The diagnostic system of claim 1, further comprising an interface module configured for providing an interface between the diagnostic system and other related system devices, services, and applications via a computer network.

3. The diagnostic system of claim 1, wherein the detection unit identifies a causal relationship that leads to finding a root cause of the faulty condition.

4. The diagnostic system of claim 1, wherein the plurality of readings of parameters or measurements are related to at least one of a process model, a kinetic model, a parametric model, an analytical tool, and a related knowledge and best practice standard.

5. The diagnostic system of claim 1, wherein the analysis unit generates a process decision tree based on at least one of an expert knowledge and a causal relationship between the faulty condition and corresponding parameters or measurements.

6. The diagnostic system of claim 1, wherein the display device includes a human machine interface configured for receiving an input signal from the operator to graphically or textually interact with the diagnostic system using the alert dashboard.

* * * * *